US012652200B2

(12) United States Patent
Ramesh et al.

(10) Patent No.: US 12,652,200 B2
(45) Date of Patent: Jun. 9, 2026

(54) FEEDFORWARD EQUALIZER NOISE SUPPRESSION

(71) Applicant: MAXLINEAR, INC., Carlsbad, CA (US)

(72) Inventors: Sridhar Ramesh, Carlsbad, CA (US); Ioannis Spyropoulos, San Diego, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 424 days.

(21) Appl. No.: 18/299,647

(22) Filed: Apr. 12, 2023

(65) Prior Publication Data

US 2023/0327922 A1     Oct. 12, 2023

Related U.S. Application Data

(60) Provisional application No. 63/362,887, filed on Apr. 12, 2022.

(51) Int. Cl.
H04L 25/03          (2006.01)
(52) U.S. Cl.
CPC .............................. H04L 25/03057 (2013.01)
(58) Field of Classification Search
CPC ......... H04L 25/00; H04L 25/02; H04L 25/03; H04L 25/03006; H04L 25/03012; H04L 25/03019; H04L 25/03057; H04L 25/03031
See application file for complete search history.

(56) References Cited

U.S. PATENT DOCUMENTS

| | | | | | |
|---|---|---|---|---|---|
| 6,011,814 | A | * | 1/2000 | Martinez ........... | H04L 25/03057 |
| | | | | | 375/233 |
| 6,442,198 | B1 | * | 8/2002 | Harman ............ | H04L 25/03057 |
| | | | | | 375/232 |
| 6,807,229 | B1 | * | 10/2004 | Kim .................. | H04L 25/03057 |
| | | | | | 375/233 |
| 6,934,345 | B2 | * | 8/2005 | Chu ...................... | H04L 25/497 |
| | | | | | 375/232 |
| 7,046,726 | B2 | * | 5/2006 | Jayaraman ........ | H04L 25/03057 |
| | | | | | 375/233 |

(Continued)

OTHER PUBLICATIONS

International Preliminary Report on Patentability in PCT/US2023/018380 mailed Oct. 24, 2024.

(Continued)

*Primary Examiner* — James M Perez
(74) *Attorney, Agent, or Firm* — Buchalter; Jason W. Croft

(57)          ABSTRACT

According to an aspect of an embodiment, a decision feedback equalizer (DFE) may be configured for noise suppression slicing. The DFE may be configured to receive, from a feedforward equalizer, an output signal having a received (Rx) symbol. The DFE may be configured to initialize noise suppression slicer (NSS) parameters including one or more initial NSS coefficients and one or more initial slicer deferred decision (SDD) threshold offsets. The DFE may be configured to determine one or more updated NSS coefficients. The DFE may be configured to determine one or more updated SDD threshold offsets. The DFE may be configured to update the NSS parameters of a processing register based on the one or more updated NSS coefficients and the one or more updated SDD threshold offsets.

20 Claims, 17 Drawing Sheets

100

(56) References Cited

U.S. PATENT DOCUMENTS

| | | | | |
|---|---|---|---|---|
| 7,483,482 | B2 * | 1/2009 | Wu | H04L 25/03057 |
| | | | | 375/233 |
| 7,505,515 | B1 * | 3/2009 | Choudhary | H04L 25/03057 |
| | | | | 348/614 |
| RE42,558 | E * | 7/2011 | Chung | H03G 3/3052 |
| | | | | 375/233 |
| 8,369,453 | B2 * | 2/2013 | Kocaman | H03F 3/195 |
| | | | | 375/345 |
| 8,559,498 | B1 * | 10/2013 | Eliaz | H04L 1/0041 |
| | | | | 375/233 |
| 8,948,237 | B2 * | 2/2015 | Kocaman | H03F 3/195 |
| | | | | 375/345 |
| 9,209,852 | B2 * | 12/2015 | Seendripu | H04L 27/362 |
| 9,270,310 | B2 * | 2/2016 | Laurent-Michel | H04B 1/1027 |
| 9,843,464 | B2 * | 12/2017 | Fine | H04L 25/03057 |
| 9,887,866 | B2 * | 2/2018 | Santa | H04L 5/001 |
| 10,142,135 | B2 * | 11/2018 | Fine | H04L 5/005 |
| 10,148,417 | B2 * | 12/2018 | Ling | H04L 25/03019 |
| 10,164,761 | B2 * | 12/2018 | Ling | H04L 7/033 |
| 10,333,758 | B2 * | 6/2019 | Santa | H04B 1/707 |
| 10,491,431 | B2 * | 11/2019 | Fine | H04L 5/005 |
| 10,666,469 | B2 * | 5/2020 | Bhattacharyya | |
| | | | | H04L 25/03146 |
| 10,826,635 | B2 * | 11/2020 | Goichberg | H04J 3/0682 |
| 11,201,693 | B2 * | 12/2021 | Fan | H04L 25/03038 |
| 11,336,489 | B1 * | 5/2022 | Lue | H04L 25/067 |
| 11,705,988 | B2 * | 7/2023 | Fan | H04L 25/03006 |
| | | | | 375/341 |
| 12,224,855 | B2 * | 2/2025 | Fan | H04L 25/067 |
| 2002/0094043 | A1 * | 7/2002 | Chu | H04L 1/0054 |
| | | | | 375/233 |
| 2002/0110198 | A1 * | 8/2002 | Agazzi | H04L 25/4917 |
| | | | | 375/288 |
| 2003/0081697 | A1 * | 5/2003 | Little | H04L 25/063 |
| | | | | 375/317 |
| 2003/0138038 | A1 * | 7/2003 | Greiss | H04L 25/14 |
| | | | | 375/232 |
| 2003/0138040 | A1 * | 7/2003 | Rouphael | H04L 25/03057 |
| | | | | 375/233 |
| 2003/0189998 | A1 * | 10/2003 | Phanse | H04B 10/6971 |
| | | | | 375/348 |
| 2003/0219085 | A1 * | 11/2003 | Endres | H03G 3/3052 |
| | | | | 348/E7.024 |
| 2004/0013190 | A1 * | 1/2004 | Jayaraman | H04L 25/03267 |
| | | | | 375/233 |
| 2004/0190649 | A1 * | 9/2004 | Endres | H03G 3/3052 |
| | | | | 375/326 |
| 2005/0129107 | A1 * | 6/2005 | Park | H04L 1/20 |
| | | | | 375/233 |
| 2006/0120475 | A1 * | 6/2006 | Zhidkov | H04L 1/0047 |
| | | | | 348/E5.003 |
| 2006/0227858 | A1 * | 10/2006 | Wu | H04L 25/03057 |
| | | | | 375/233 |
| 2007/0110199 | A1 * | 5/2007 | Momtaz | H04L 25/03057 |
| | | | | 375/350 |
| 2007/0230557 | A1 * | 10/2007 | Balasubramonian | |
| | | | | H03H 21/0012 |
| | | | | 375/232 |
| 2008/0049824 | A1 * | 2/2008 | Yang | H04L 25/03057 |
| | | | | 375/232 |
| 2010/0135442 | A1 * | 6/2010 | Kocaman | H03F 3/195 |
| | | | | 375/346 |
| 2012/0194375 | A1 * | 8/2012 | Vigoda | G06J 1/00 |
| | | | | 341/155 |
| 2012/0257692 | A1 * | 10/2012 | Yeung | H04L 25/061 |
| | | | | 375/320 |
| 2013/0094561 | A1 * | 4/2013 | Raphaeli | H04L 25/03057 |
| | | | | 375/233 |
| 2013/0121391 | A1 * | 5/2013 | Kocaman | H03F 3/195 |
| | | | | 375/224 |
| 2014/0092948 | A1 * | 4/2014 | Tal | H04L 25/0307 |
| | | | | 375/224 |
| 2015/0124912 | A1 * | 5/2015 | Eliaz | H04L 1/005 |
| | | | | 375/343 |
| 2015/0222322 | A1 * | 8/2015 | Moffatt | H04L 5/0073 |
| | | | | 375/136 |
| 2015/0349988 | A1 * | 12/2015 | Annampedu | H04L 25/03019 |
| | | | | 375/231 |
| 2017/0134189 | A1 * | 5/2017 | Sadeghi-Emamchaie | |
| | | | | H04L 27/2627 |
| 2020/0252247 | A1 * | 8/2020 | Palusa | H04L 25/03878 |
| 2023/0118769 | A1 * | 4/2023 | Liu | H04L 25/4917 |
| 2023/0327922 | A1 * | 10/2023 | Ramesh | H04L 25/03318 |
| 2023/0370192 | A1 * | 11/2023 | Fan | H04L 25/0204 |
| 2025/0279915 | A1 * | 9/2025 | Ramesh | H04L 25/03057 |
| 2025/0392499 | A1 * | 12/2025 | Barakatain | H04L 25/03012 |

OTHER PUBLICATIONS

Sophocles J. Orfanidis, Applied Optimum Signal Processing, ECE Department Rutgers University, Chapter 11, p. 174-503, 2018 <http://www.ece.rutgers.edu/~orfanidi/aosp>.
International Search Report and Written Opinion in PCT/US2023/018380 mailed Jul. 6, 2023.

* cited by examiner

200

210

212 — Set NSS parameters based on hardware configuration

220

222 — FFE output capture

224 — Extract slicer error from capture

226 — Estimate slicer error autocorrelation

228 — Compute instantaneous NSS coefficients

270

230 — Feed computed coefficients to IIR filters;

232 — Update NSS coefficients to IIR outputs

240

242 — Map SNR to SDD region as a fraction of slicer output distance

260

244 — Compute SDD threshold offsets

246 — Compute outer slicer error min and max limits

250

252 — Set NSS parameters based on hardware configuration

254 — Write NSS parameters to hardware

FIG. 2

*800* receive the Rx symbol from the feedforward equalizer            ⌐ *805* compute a slicer deferred decision (SDD) region to identify an
SDD            ⌐ *810* apply the SDD to the Rx symbol when an Rx symbol value is in
the SDD region            ⌐ *815*

Apply a slicer hard decision to the Rx symbol when the Rx
symbol value is not in the SDD region            ⌐ *820*

900 estimate a slicer error correlation based on a slicer error from a slicer input ⟋ 905 compute one or more noise suppression slice (NSS) coefficients based on the slicer error correlation ⟋ 910 apply noise suppression to the slicer input based on the one or more NSS coefficients ⟋ 915 estimate the Rx symbol after noise suppression has been applied ⟋ 920

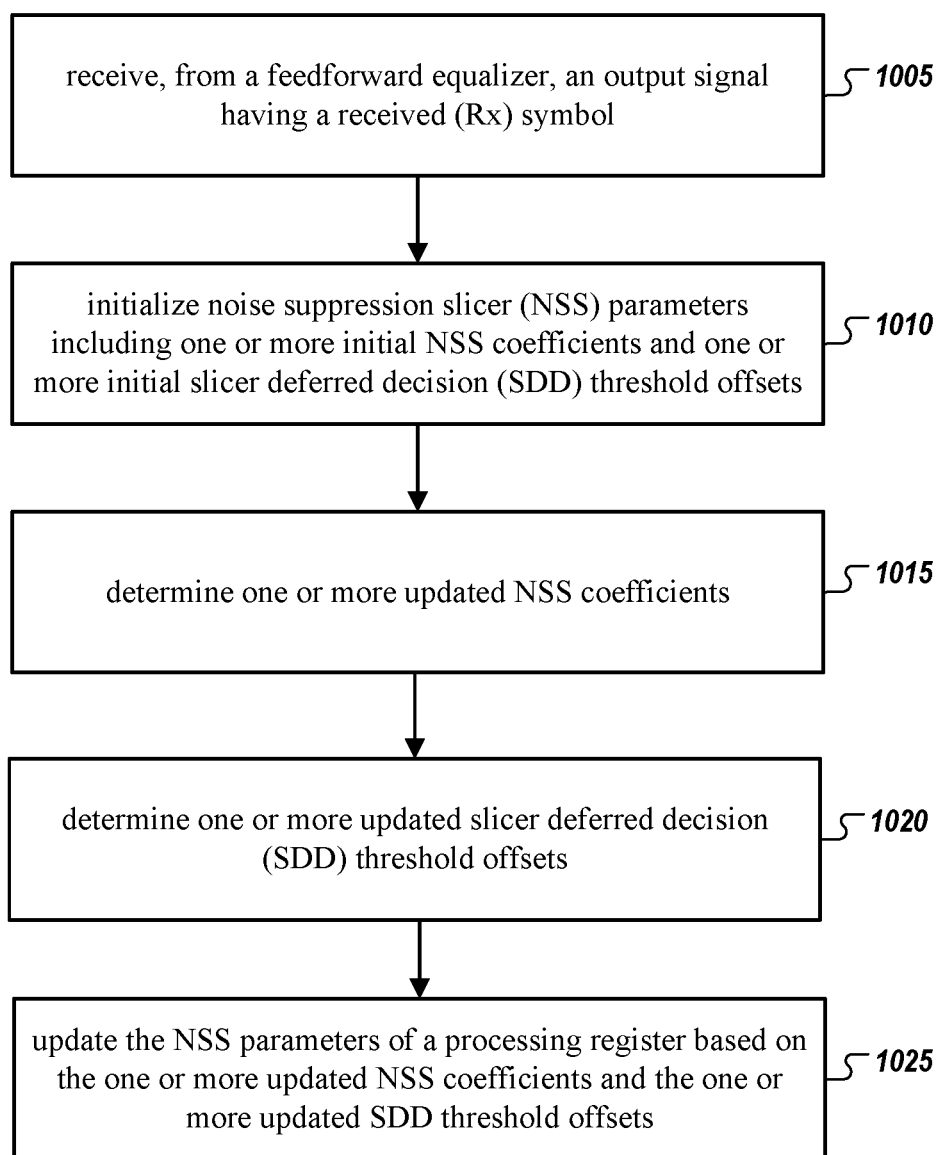

*1000* receive, from a feedforward equalizer, an output signal having a received (Rx) symbol — *1005* initialize noise suppression slicer (NSS) parameters including one or more initial NSS coefficients and one or more initial slicer deferred decision (SDD) threshold offsets — *1010* determine one or more updated NSS coefficients — *1015* determine one or more updated slicer deferred decision (SDD) threshold offsets — *1020* update the NSS parameters of a processing register based on the one or more updated NSS coefficients and the one or more updated SDD threshold offsets — *1025*

FIG. 10

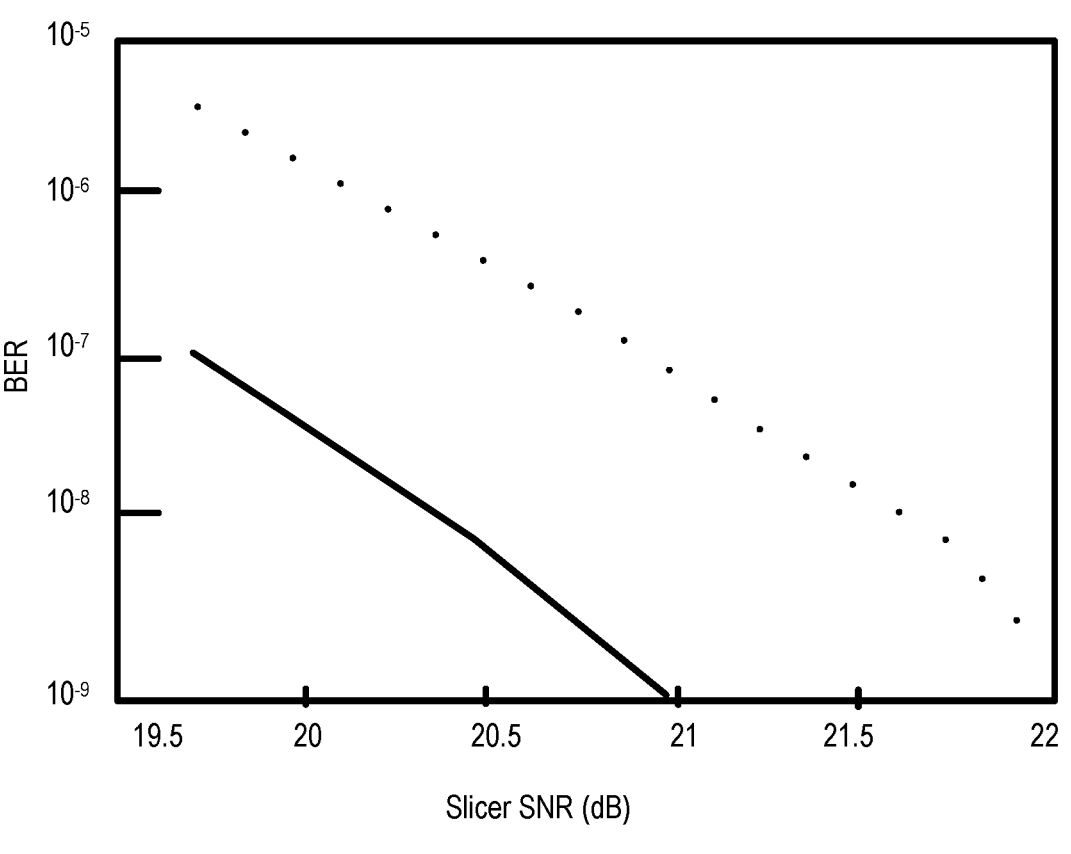
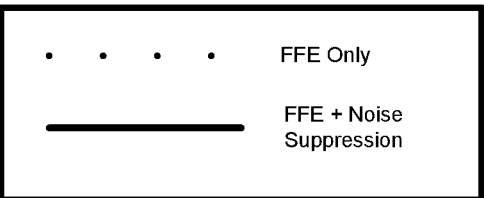
FIG. 13B

FEEDFORWARD EQUALIZER NOISE SUPPRESSION

RELATED APPLICATION

This application claims the benefit of U.S. Provisional Application No. 63/362,887, filed Apr. 12, 2022, the disclosure of which is incorporated herein by reference in its entirety.

FIELD

The embodiments discussed in the present disclosure are related to feedforward equalizer noise suppression, and in some embodiments, noise suppression using a noise suppression slicer or a maximum likelihood sequence estimator (MLSE).

BACKGROUND

Unless otherwise indicated herein, the materials described herein are not prior art to the claims in the present application and are not admitted to be prior art by inclusion in this section.

An equalizer may compensate or adjust for signal distortions and/or interference. In some cases, an equalizer may flatten the frequency representation (e.g., power spectral density) of a signal transmitted through a channel. When equalized, the frequency domain properties of a signal may be communicated more reliably from the transmitting end to the receiving end.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In some embodiments, a decision feedback equalizer (DFE) may be configured for noise suppression slicing. The DFE may be configured to receive, from a feedforward equalizer, an output signal having a received (Rx) symbol. The DFE may be configured to initialize noise suppression slicer (NSS) parameters including one or more initial NSS coefficients and one or more initial slicer deferred decision (SDD) threshold offsets. The DFE may be configured to determine one or more updated NSS coefficients. The DFE may be configured to determine one or more updated SDD threshold offsets. The DFE may be configured to update the NSS parameters of a processing register based on the one or more updated NSS coefficients and the one or more updated SDD threshold offsets.

In some embodiments, a DFE may be configured for noise suppression slicing. The DFE may comprise a feedforward equalizer configured to output a signal having an Rx symbol, and a processing device. The processing device may be configured to receive the Rx symbol from the feedforward equalizer. The processing device may be configured to compute an SDD region to identify an SDD. The processing device may be configured to apply the SDD to the Rx symbol when an Rx symbol value is in the SDD region. The processing device may be configured to apply a slicer hard decision to the Rx symbol when the Rx symbol value is not in the SDD region.

In some embodiments, a DFE may be configured for noise suppression slicing. The DFE may comprise a feedforward equalizer configured to output a signal having an Rx symbol, and a processing device. The processing device may be configured to estimate a slicer error correlation based on a slicer error from a slicer input. The processing device may be configured to compute one or more NSS coefficients based on the slicer error correlation. The processing device may be configured to apply noise suppression to the slicer input based on the one or more NSS coefficients. The processing device may be configured to estimate the Rx symbol after noise suppression has been applied.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 2 illustrates a flow diagram for feedforward equalizer (FFE) noise suppression using a noise suppression slicer logic.

FIG. 10 illustrates a process flow for a computer readable medium used for a DFE device.

FIG. 13B illustrates example results using FFE and noise expression.

DESCRIPTION OF EMBODIMENTS

Figure 1:
FIG. 1 illustrates an example predictive decision feedback equalizer (DFE).

Equalizers may be used in digital communications to reduce distortions and interference of a signal. Feedforward equalizers (FFEs) may be used to reduce distortions and/or interference in a channel of a communication signal. Equalizers may also be used to reduce inter-symbol interference (ISI). A decision feedback equalizer (DFE) may use non-linear equalization to correct pre-cursor symbols to reduce the noise and/or interference that may distort a current received symbol. Various digital equalizers may be used to reduce inter-symbol interference including linear equalizers (e.g., MMSE equalizers and zero-forcing equalizers), blind equalizers (estimates the transmitted signal without channel statistic knowledge), adaptive equalizers, and the like.

In some scenarios, in high loss channels, feedforward equalizer (FFE) and/or a continuous-time linear equalizer (CTLE) noise boosting may create correlated noise. That is the noise for a current symbol may be correlated with noise generated at neighboring symbols. However, the correlated noise produced at neighboring symbols may not be reliably estimated.

Furthermore, bit error rate (BER) degradation may result when an FFE is deployed. That is, the bit error rate may increase and may not approach a theoretical lower bound. Furthermore, the BER degradation may be combined with an increased amount of power usage.

A DFE may provide a degree of post-cursor mitigation, but at a cost of a high power impact. When the feedforward equalizer (FFE) and the feedback filter (FBF) of a DFE are implemented in separate pipelines, the power usage may increase. Furthermore, combining an FBF with an FFE may use additional components that may introduce further noise into the communication system. Therefore, reducing the BER degradation associated with an FFE by using a DFE may be associated with a cost.

In some embodiments, implementing noise suppression within the FFE pipeline may enhance performance and use fewer resources such as power. For example, the power efficiency and the performance may be enhanced compared to a conventional DFE using separate pipelines and no noise suppression. Furthermore, the systems and methods provided herein may include a DFE that applies noise suppression based on one or more pre-cursor taps and post-cursor taps to a small subset of Rx symbols which may further enhance performance and power impact.

In some embodiments, a DFE may be configured for noise suppression slicing. The DFE may be configured to receive, from a feedforward equalizer, an output signal having a received (Rx) symbol. The DFE may be configured to initialize noise suppression slicer (NSS) parameters including one or more initial NSS coefficients and one or more initial slicer deferred decision (SDD) threshold offsets. The DFE may be configured to determine one or more updated NSS coefficients. The DFE may be configured to determine one or more updated SDD threshold offsets. The DFE may be configured to update the NSS parameters of a processing register based on the one or more updated NSS coefficients and the one or more updated SDD threshold offsets.

Embodiments of the present disclosure will be explained with reference to the accompanying drawings.

In some embodiments, as illustrated in FIG. 1, an example of a predictive decision feedback equalizer (DFE) 100 may be provided. The DFE 100 may be a nonlinear channel equalizer to mitigate inter-symbol interference (ISI). The DFE 100 may include two filters: (i) a feedforward filter (FFF) 102, and (ii) a feedback filter (FBF) 106. The DFE may include one or more of: a decision device 104, one or more subtractors 112, 114, 116, or the like.

In some embodiments, the FFF 102 may receive an input signal having additive white Gaussian noise (AWGN) 122. In some examples, the FFF 102 may include a fractionally spaced equalizer (FSE). The FBF 106 may be used to remove some or all of the ISI from current symbols that may be caused by previous symbols.

In some embodiments, the feedforward filter 102 may be configured to output a signal 124 including one or more of a desired symbol, ISI, and AWGN. The signal 124 may be directed to a subtractor 112 which may be configured to output a desired symbol and prediction error signal 126 (i.e., including one or more of the desired symbol and a prediction error) to one or more of the decision device 104 and the subtractor 136. Alternatively or in addition, the signal 124 may be directed to the subtractor 116 which may be configured to subtract a desired symbol signal 128 from the signal 124 (having one or more of the desired symbol, the ISI, and the AWGN) and generate a signal 132 to be directed to the FBF 106. Alternatively, or in addition, the signal 132 may be directed to the FFF 102.

In some embodiments, the FBF 106 may include a linear predictor (e.g., using noise suppression slicing or minimum likelihood sequence estimation (MLSE)). In some DFEs 100, any suitable number of taps (e.g., infinite) may be used. In some DFEs 100, the FFF 102 may have an infinite number of taps.

In some embodiments, the FBF 106 may be configured to direct an output prediction signal 134 to the subtractor 112. The output prediction signal 134 may be subtracted from the signal 124 (i.e., having one or more of the desired symbol, ISI, and AWGN) to output the desired symbol and prediction error signal 126 to the decision device 104 and to the subtractor 114.

In some embodiments, the subtractor 114 may be configured to subtract the desired symbol and prediction error signal 126 from the desired symbol signal 128 (which may be output from the decision device 104) to generate an error signal 136 that may be directed to the feedback filter 106. In some embodiments, the desired symbol signal 128 may be directed to provide an output decision signal 138.

In some embodiments, when DFE 100 is implemented within an FFE pipeline, the performance may be increased relative to baseline and the power usage may be reduced relative to baseline. In some examples, the decrease in power usage relative to baseline (in which the DFE 100 is not implemented within an FFE pipeline) may be greater than one or more of: 50%, 60%, 70%, 80%, 90%, 95%, 98%, or 99% when compared to the baseline.

In some embodiments, the DFE 100 may use various taps including n+−1 taps (i.e., $1^{st}$ pre-cursor and $1^{st}$ post-cursor taps) which may be used for a subset of symbols that may be allocated for slicer deferred decisions. Alternatively, or in addition, the DFE may use n+−2 taps (i.e., $2^{nd}$ pre-cursor and $2^{nd}$ post-cursor taps) which may be used for a subset of symbols that may be allocated for the slicer deferred decisions. In some examples, using a combination of n+−1 taps and n+−2 taps may increase the performance when measured in units of decibels compared to a baseline in which the combination of n+−1 taps and n+−2 taps is not used (e.g., the n+−1 taps are used but the n+−2 taps are not used). In some examples, the increase in performance may be greater than one or more of: 5%, 10%, 15%, 20%, 25%, 30%, or 50% when compared to the baseline.

In some embodiments, FIG. 2 illustrates a process flow diagram 200 for DFE noise suppression using one or more of noise suppression slicing or MILE. The process flow diagram 200 may be performed by processing logic that may include hardware (circuitry, dedicated logic, etc.), software (e.g., firmware, or such as is run on a computer system or a dedicated machine), or a combination of both, which processing logic may be included in the processing device 1202

US 12,652,200 B2

Figure 11:
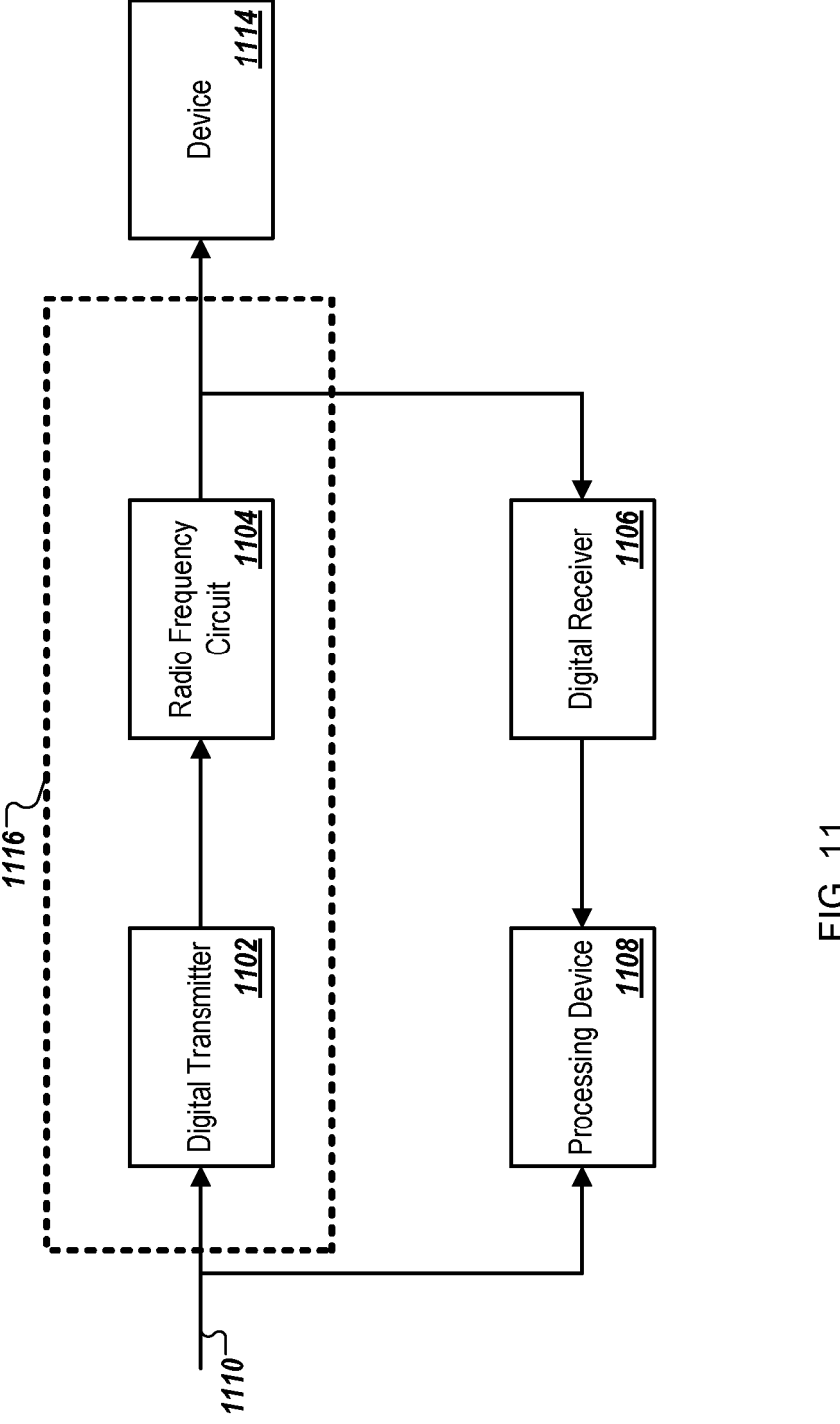
FIG. 11 illustrates an example communication system.
Figure 12:
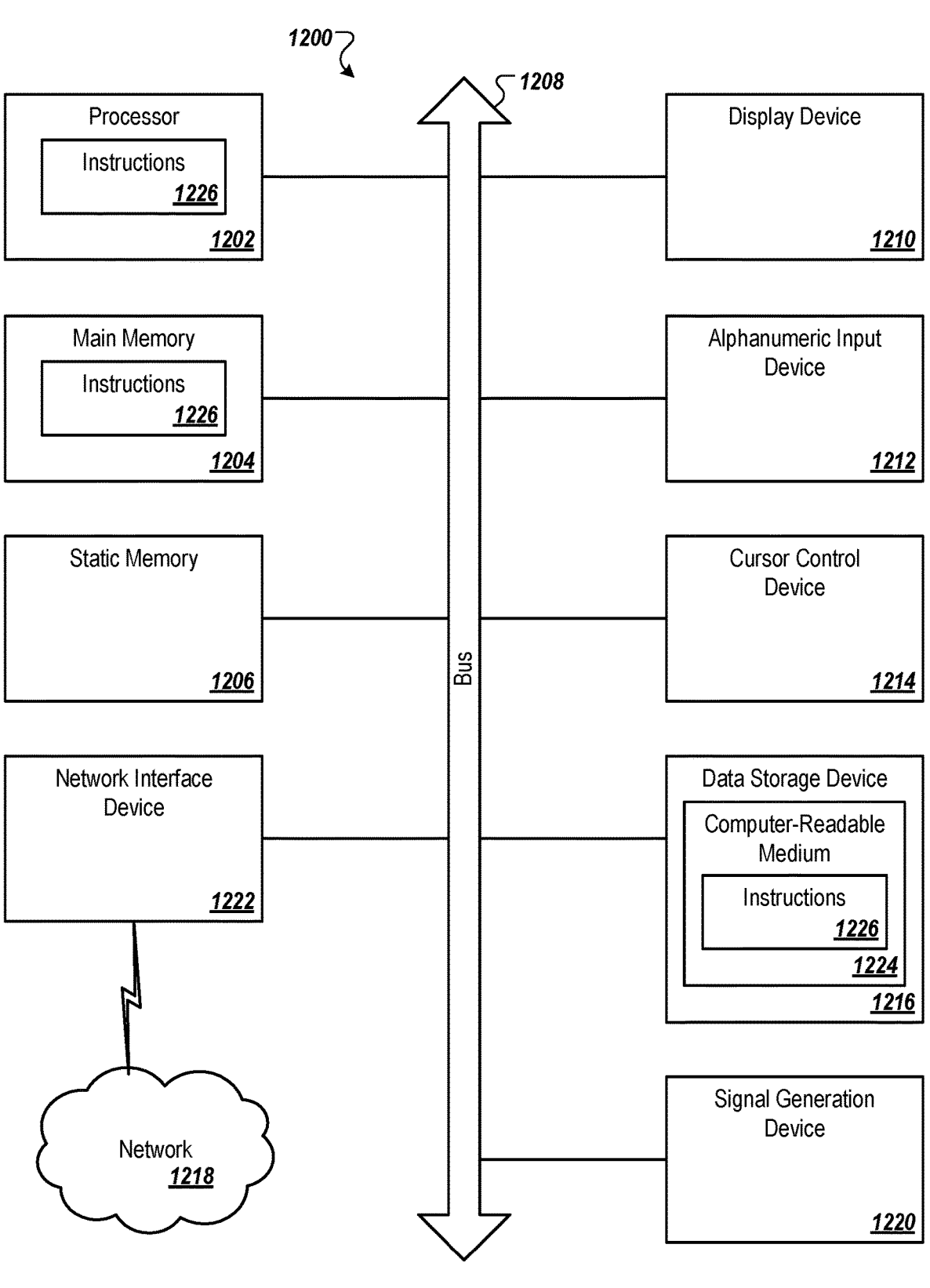
FIG. 12 illustrates a diagrammatic representation of a machine in the example form of a computing device within which a set of instructions, for causing the machine to perform any one or more of the methods discussed herein, may be executed.

5 of FIG. 12, the communication system 1100 of FIG. 11, or another device, combination of devices, or systems.

In some embodiments, the processing logic may be configured to receive, from an FFE, a signal having a desired symbol (e.g., a received (Rx) symbol) and a prediction error (e.g., $E_p(\omega)$)). In one example, the processing logic may be configured to initialize noise suppression slicer (NSS) parameters including initial NSS coefficients and initial slicer deferred decision (SDD) thresholds (e.g., threshold offsets), as may be implemented in block 210. Alternatively, or in addition, the processing logic may be configured to determine updated NSS coefficients, as may be implemented in block 220. Alternatively, or in addition, the processing logic may be configured to determine updated slicer deferred decision (SDD) thresholds (e.g., updated SDD threshold offsets), as may be implemented in block 240. Alternatively, or in addition, the processing logic may be configured to update the NSS parameters of a processing register based on the updated NSS coefficients and the updated SDD thresholds (e.g., updated SDD threshold offsets) as may be implemented in block 250.

In some embodiments, the NSS parameters may include any suitable parameters that may be used to reduce noise in noise suppression slicing or in MLSE. The NSS parameters may include one or more of: (i) NSS coefficients, (ii) SDD thresholds (e.g., SDD threshold offsets), (iii) slicer error minimum limits (e.g., outer slicer error minimum limits), (iv) slicer error maximum limits (e.g., outer slicer error maximum limits), or the like.

In some embodiments, as may be implemented in block 210 using operation 212, the processing logic may be configured to initialize noise suppression slicer (NSS) parameters by setting the NSS parameters to a hardware optimum. That is, the NSS parameters may be configured for a particular hardware implementation.

In some embodiments, as may be implemented in block 220 using one or more of operations 222, 224, 226, 228, 230, 232, or the like, the processing logic may be configured to determine updated NSS coefficients. As shown in operation 222, the processing logic may be configured to capture an FFE output. As shown in operation 224, the processing logic may be configured to extract a slicer error from the capture of the FFE output. As shown in operation 226, the processing logic may be configured to estimate a slicer error correlation (e.g., a slicer error autocorrelation). As shown in operation 228, the processing logic may be configured to compute NSS coefficients. The NSS coefficients may be computed instantaneously in one example. As shown in operation 230, the processing logic may be configured to provide the NSS coefficients to an infinite impulse response (IIR) filter. As shown in operation 232, the processing logic may be configured to update the NSS coefficients (e.g., as computed in block 210 and/or in operation 212) to be the outputs from the IIR filter.

In some embodiments, the slicer error correlation may be estimated based on a slicer error as computed from the slicer input (e.g., the slicer data captures in signal 126) and the slicer thresholds and outputs that may have been a priori estimated from the signal waveform at the FFE output. The error correlation may be based on the slicer data captures which may be used to extract the slicer error to compute the slicer error autocorrelation. In one example, the slicer error correlation (e.g., the slicer error autocorrelation) may be used to determine the NSS coefficients.

In some embodiments, alternatively or in addition, the error correlation (e.g., cross correlation and/or autocorrelation) may be estimated based on the channel noise of a signal 122 directed from, e.g., the output of an analog to digital converter (ADC), to the FFE. The channel noise may include (i) AWGN introduced at the ADC output; (ii) non-independently and identically distributed (IID) (i.e., correlated) error introduced by a continuous-time linear equalizer (CTLE); (iii) other (e.g. non-linear) distortions. Without considering the non-linear distortions, the error correlation at the slicer input may be estimated based on: (a) the second order statistics of channel noise components and (b) the FFE tap values. As a result, the NSS coefficients may be estimated based on the second order statistics of channel noise components (a) and (b) and the FFE tap values.

In some embodiments, the slicer error correlation (e.g., cross correlation and/or autocorrelation) may be estimated based on correlated noise from neighboring symbols within a proximity that is selected to reduce the slicer error in the slicer input. In one example, the neighboring symbols may include one or more of: the n+−1 taps; the n+−2 taps; the n+−3 taps; the n+−4 taps; the n+−5 taps, and the like.

In some embodiments, as shown in block 228, the processing logic may be configured to compute noise suppression slicer (NSS) coefficients based on the slicer error correlation. The NSS coefficients may be sent to one or more IIR filters, as shown in block 230, and the NSS coefficients may be updated based on IIR outputs from the IIR filters, as shown in block 232.

In some embodiments, the NSS coefficients may be computed using various methods including one or more of: (i) a Wiener-Hopf computation, (ii) a time-domain correlation, (iii) a frequency domain correlation, (iv) a fast Fourier transform computation, (v) a discrete Fourier transform computation, (vi) a power spectral density computation. In one example, the Wiener-Hopf computation may be used to determine NSS coefficients that may be configured to combine the noise samples from a precursor sample and a post-cursor sample to suppress a selected amount of noise of a desired symbol.

In some embodiments, when the NSS coefficients have been determined, the processing logic may be configured to update the NSS parameters of a processing register based on the updated NSS coefficients as may be implemented in block 250. Block 250 may be implemented by setting the NSS parameters (e.g., the NSS coefficients) to the optimum for the particular hardware, as shown in operation 252, and the NSS parameters (e.g., the NSS coefficients) may be written to a register of the processing device, as shown in operation 254. In one example, the NSS parameters (e.g. NSS coefficients) may be programmed into the noise suppression slicer block hardware (e.g., the registers of a processing device) to execute a hardware algorithm on incoming signal samples for noise suppression.

In some embodiments, when the NSS coefficients have been written to the register of the processing device, the processing logic may be configured to apply noise suppression to the slicer input based on the NSS coefficients. The processing logic may be configured to estimate the Rx symbol after noise suppression has been applied (e.g., by applying a slicer hard decision to the Rx symbol).

Figure 4:
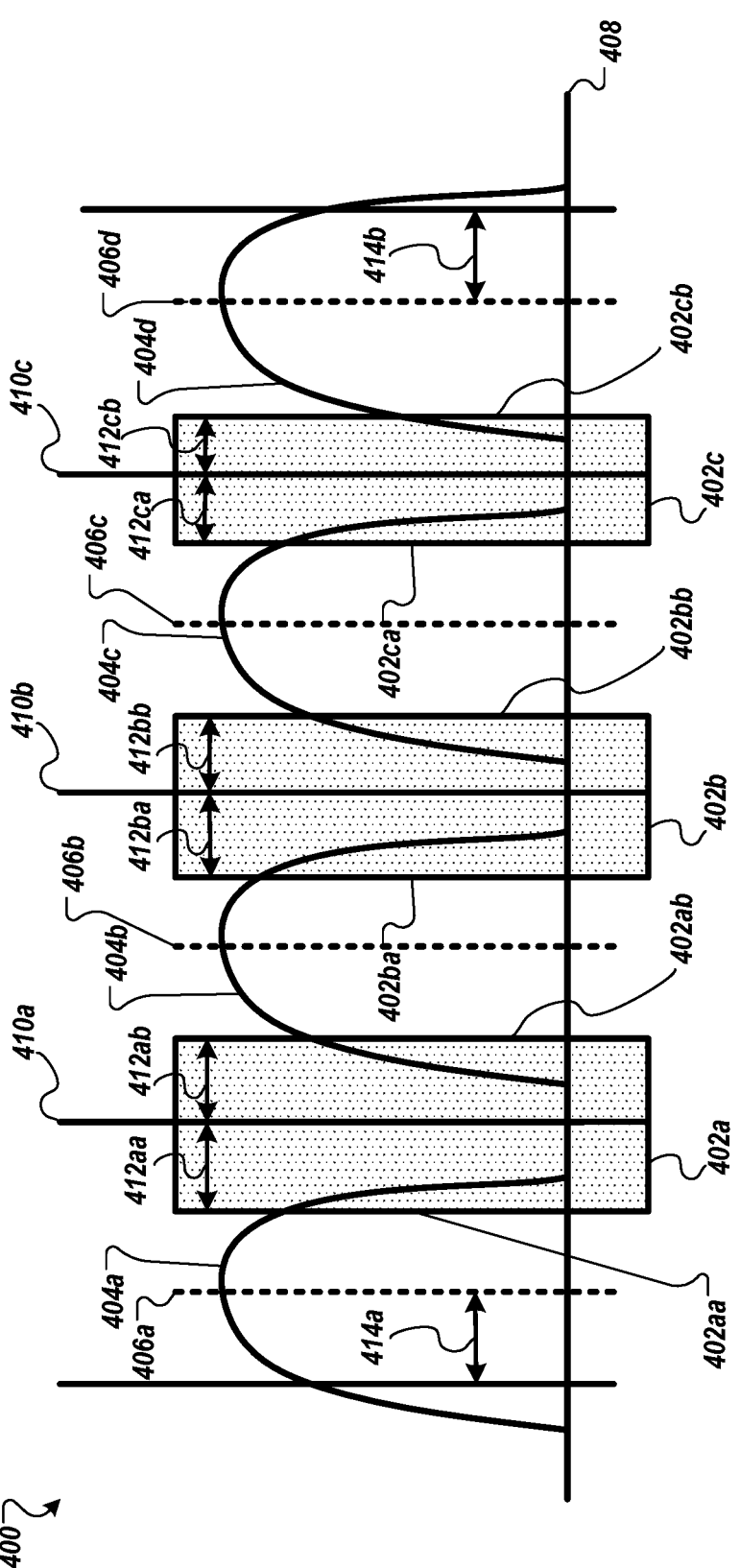
FIG. 4 illustrates an example decision scheme for the FFE and DFE.

In some embodiments, as may be implemented in block 240, the processing logic may be configured to determine updated slicer deferred decision (SDD) thresholds (e.g., 402aa, 402ab, 402ba, 402bb, 402ca, and 402cb as shown in FIG. 4). The processing logic may be configured to compute a signal-to-noise ratio (SNR) or a signal to noise and distortion (SNDR) of a signal (e.g., an FFE output signal) around a slicer threshold (e.g., 410a, 410b, 410c, as shown in FIG. 4).

In some embodiments, as shown in operation 242, the processing logic may be configured to map the SNR to SDD region as a fraction of slicer output distance (e.g., map the computed SNR or SNDR to the width of an SDD region that optimizes the probability of bit error after noise suppression). Such a mapping may be a priori computed by applying statistical signal processing techniques—assuming certain channel second order statistics—or empirically estimated for a given channel and, then, stored in a look-up table. For some bandwidth limited channels, higher SNR or SNDR values may be mapped to narrower SDD regions for optimum bit error rate performance. For storage in a look-up table, the width of an SDD region may be expressed as a fraction of the distance between the slicer outputs around a slicer threshold (e.g. the width of SDD region 402a may be expressed as a fraction of the distance between slicer outputs 406a and 406b, around slicer threshold 410a, as shown in FIG. 4). Alternatively, the width of an SDD region (e.g. SDD region 402a in FIG. 4) may be expressed as the distance between a first location (in a signal amplitude domain), as identified by a first SDD threshold (e.g., SDD threshold 402aa in FIG. 4) and a second location (in the signal amplitude domain), as identified by a second SDD threshold offset (e.g., SDD threshold 402ab in FIG. 4).

In some embodiments, the processing logic may be configured to compute SDD threshold offsets, as shown in operation 244. The SDD threshold offsets may comprise one or more of a first SDD threshold offset (e.g., 412aa, 412ba, 412ca in FIG. 4) and a second SDD threshold offset (e.g., 412ab, 412bb, 412cb, respectively, in FIG. 4) relative to the same slicer threshold (e.g., 410a, 410b, 410c in FIG. 4). That is SDD threshold offsets (412aa and 412ab in FIG. 4) may be defined relative to a slicer threshold (410a in FIG. 4). The first SDD threshold offset (e.g., 412aa in FIG. 4) identifies a first SDD threshold (e.g., 402aa in FIG. 4) while the second SDD threshold (e.g., 412ab in FIG. 4) identifies a second SDD threshold (e.g., 402ab in FIG. 4). The SDD region may be the region between the first SDD threshold (e.g., 402aa in FIG. 4) and the second SDD threshold (e.g., 412ab in FIG. 4). The SDD region may be used to identify a slicer deferred decision or slicer hard decision for an Rx symbol. In one example, the processing logic may be configured to apply the slicer deferred decision to the Rx symbol when the Rx symbol value is in the SDD region. In another example, the processing logic may be configured to apply the slicer hard decision to the Rx symbol when the Rx symbol value is not in the SDD region. In some examples, the SDD region may be computed based on one or more test cases to set values for the SDD threshold offsets.

In some embodiments, the processing logic may be configured to compute an outer slicer error minimum limit (e.g., 414a in FIG. 4) and an outer slicer error maximum limit (e.g., 414b in FIG. 4), as shown in operation 246. The outer slicer error minimum limit (e.g., 414a in FIG. 4) may be computed as the negative of the distance between the lowest slicer output (e.g., 406a in FIG. 4) and the lowest SDD threshold (e.g., 402aa in FIG. 4). The outer slicer error maximum limit may be computed as the distance between the highest slicer output (e.g., 406d in FIG. 4) and the highest SDD threshold (e.g., 402cb in FIG. 4). These limits may be applied to restrict the slicer error of an Rx symbol that lies below the lowest slicer output (e.g., 406a in FIG. 4) or above the highest slicer output (e.g., 406d in FIG. 4) before using the slicer error for noise suppression of a previous or subsequent Rx symbol that lies in an SDD region. In some embodiments, restricting the value of outer slicer errors used in noise suppression may improve the accuracy of the noise estimate of an Rx symbol in an SDD region, resulting in enhanced hard decision and bit error performance.

In some embodiments, the processing logic may be configured to apply noise suppression to the slicer input. After noise suppression has been applied, an updated SDD region may be computed based on the updated SDD threshold offsets. The processing logic may be configured to apply an updated slicer hard decision to the Rx symbol when the Rx symbol value is not in the updated SDD region. The processing logic may be configured to apply an updated SDD to the Rx symbol when the Rx symbol value is in the updated SDD region.

In some embodiments, as may be implemented in block 250, the processing logic may be configured to update the registers of a processing device. In one embodiment, the processing logic may be configured to set the SDD threshold offsets, or the outer slicer error minimum limit, or the outer slicer error maximum limit, or a combination thereof based on the hardware configuration, as shown in operation 252. In another embodiments, the processing logic may be configured to write the SDD threshold offsets to the hardware (e.g., the registers of a processing device), as shown in operation 254. In one example, the SDD threshold offsets may be programmed into the noise suppression slicer block hardware (e.g., the registers of a processing device) to execute a hardware algorithm on incoming signal samples for noise suppression.

In some embodiments, the sequence of computation of NSS coefficients and SDD threshold offsets may be reversed. In one example, block 240 may be computed before block 220 is computed. In another example, operation 244 may be performed before operation 228.

Figure 6:
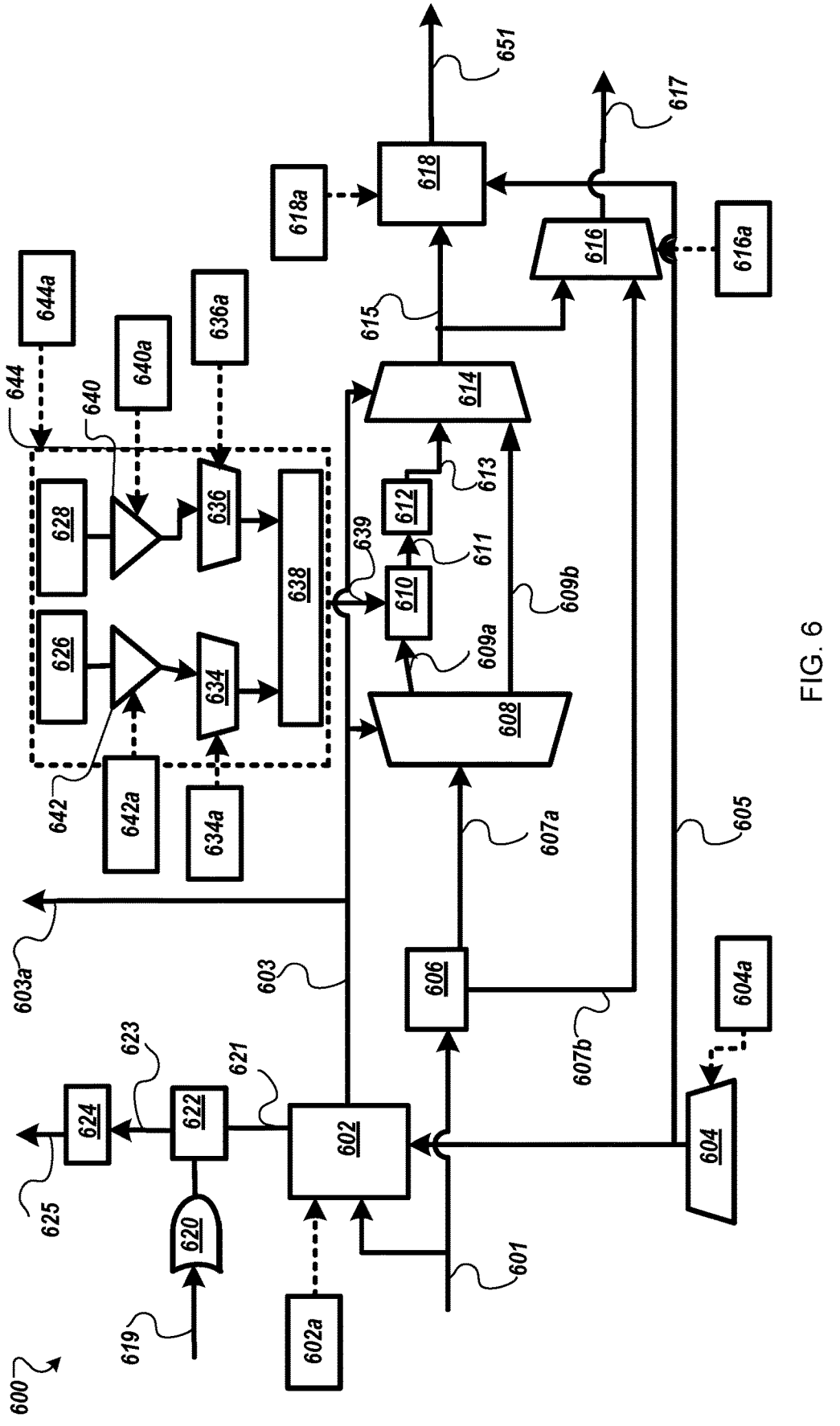
FIG. 6 illustrates a block diagram of an example noise suppression slicer.

In some embodiments, operations 244 and 246 (labeled by box 260) may correspond to the operations labeled 602a in FIG. 6 to illustrate the relationship between the NSS hardware in FIG. 6 and the process flow in FIG. 2.

In some embodiments, the SDD region may be computed and set in the hardware of FIG. 6 without updating the SDD region. Alternatively or in addition, the processing logic may be configured to write the first SDD threshold offset and the second SDD threshold offset to a register of the processing device. The processing logic may be configured to compute the SDD region in one or more of in real-time or on-demand.

In some embodiments, the processing logic may be configured to write the slicer error minimum limit (e.g., the outer slicer error minimum limit) and the slicer error maximum limit (e.g., the outer slicer error maximum limit) to a register of the processing device.

In some embodiments, operations 230 and 232 (labeled by box 270) may correspond to the operations labeled 640a and 642a in FIG. 6 to illustrate the relationship between the NSS hardware in FIG. 6 and the process flow in FIG. 2.

In some embodiments, the NSS coefficients may be computed periodically, in real-time, instantaneously, and/or on-demand and set in the hardware of FIG. 6. In one example, the processing logic may be configured to write the NSS coefficients to a register of the processing device.

Figure 3:
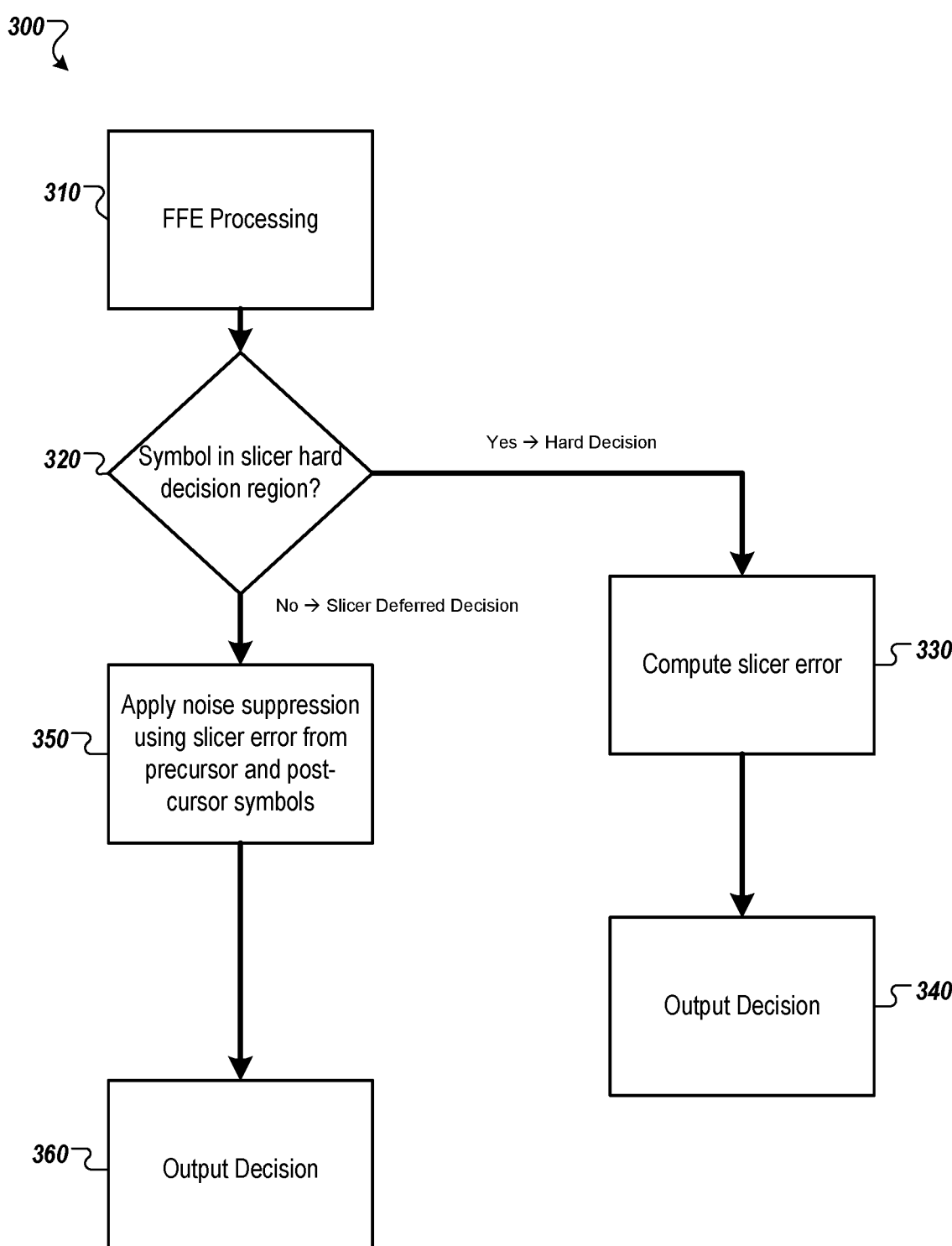
FIG. 3 illustrates a flow diagram for decision making in an example equalization system.

In some embodiments, FIG. 3 illustrates a process flow diagram 300 for decision making in an example equalization system. Processing logic for an FFE may be configured as shown in operation 310. A comparator may be used to determine whether a symbol is in a slicer hard decision region (e.g., using the example of FIG. 4) or a slicer deferred decision region (e.g., also illustrated in FIG. 4). The comparator operation 320 may not provide additional processing overhead compared to baseline FFE processing without the inclusion of the comparator operation 320.

In some embodiments, when the comparator operation 320 determines that a symbol is in a slicer hard decision region, then the processing logic may be configured to: compute the slicer error, as shown in operation 330, and output a decision, as shown in operation 340. In some examples, the processing logic may be configured to discontinue Rx symbol processing after the slicer hard decision has been applied to the Rx symbol. Discontinuing symbol processing may facilitate a decrease in power usage compared to baseline FFE processing in which symbol processing is not discontinued after symbol processing.

In some embodiments, when the comparator operation 320 determines that an Rx symbol is not in a slicer hard decision region or that the symbol is in a slicer deferred decision region, then the processing logic may be configured to apply noise suppression using the slicer error from precursor and post-cursor symbols (e.g., hard sliced Rx symbols), as shown in operation 350. In some examples, the slicer error of the precursor and post-cursor symbols may be used to compute a slicer error estimator or predictor (i.e., a noise suppression term) for the current Rx symbol (n) that may be based on a weighted combination of one or more of: slicer error from an (n−1) symbol and an (n+1) symbol; slicer error from an (n−2) symbol and an (n+2) symbol; slicer error from an (n−3) symbol and an (n+3) symbol; slicer error from an (n−4) symbol and an (n+4) symbol, or the like. In some examples, combining weights of the slicer errors may provide the NSS coefficients computed by operation 220 in FIG. 2. In some embodiments, when noise suppression has been applied (e.g., using the slicer error estimator or predictor), the processing logic may be configured to provide an output decision, as shown in operation 360.

In some embodiments, additional processing (e.g., computing the slicer error of a hard sliced Rx symbol or using it for noise suppression) may be conditional on the slicer deferred decision being entered; therefore, the additional processing may be gated. A probability of an Rx symbol being processed using a slicer deferred decision may be a low probability (e.g., less than 1 in 1000). Consequently, the power impact resulting from the process flow 300 may be less than, e.g., 3% of FFE power usage.

In some embodiments, FIG. 4 illustrates an example 400 of slicer deferred decision and slicer hard decision determination for the FFE and DFE in the case of a quadrature pulse amplitude modulated (PAM4) Rx signal. For example, for lossy channels a symbol by symbol equalization technique may not be sufficient to result in reliable slicer hard decisions at the slicer output. In some examples, when an Rx symbol is in a slicer deferred decision region (i.e., close to a slicer threshold between different symbol values), the Rx symbol may be re-evaluated after noise suppression. Noise suppression may be performed using processing logic configured to adjust the slicer input based on correlated noise from neighboring symbols with hard decisions. In one example, a first precursor symbol (i.e., n−1) and a first post-cursor symbol (i.e., n+1) may be used to compute an estimator or predictor (e.g., a slicer error estimator) to suppress the noise in the current Rx symbol (i.e., n). In some examples, the neighboring symbols may include any suitable number of precursor symbols or post-cursor symbols that may reduce the Rx symbol noise below a suitable amount to facilitate a slicer hard decision.

In some embodiments, when an equalized Rx symbol is in a hard decision region, i.e., the region along the histogram

404*a*, 404*b*, 404*c*, 404*d* that is not in the slicer deferred decision regions 402*a*, 402*b*, 402*c*, then a slicer hard decision may be applied to the symbol based on slicer thresholds 410*a*, 410*b*, 410*c* to map it to one of the slicer outputs 406*a*, 406*b*, 406*c*, or 406*d*. In contrast, when the symbol is in a slicer deferred decision region 402*a*, 402*b*, 402*c*, i.e., the region around a slicer threshold 410*a*, 410*b*, or 410*c*, then a slicer deferred decision may be applied to the symbol.

In some embodiments, the slicer deferred decision region may be defined using a first SDD threshold (e.g., 402*aa*, 402*ba*, 402*ca*) and a second SDD threshold (e.g., 402*ab*, 402*bb*, 402*cb*). A first SDD threshold and a second SDD threshold may define a region on the axis 408 (e.g., 402*a*, 402*b*, 402*c*) between which a symbol waveform may be processed using a slicer deferred decision instead of a slicer hard decision. In some examples, the first SDD threshold may be expressed as a negative offset (e.g., 412*aa*, 412*ba*, 412*ca*) from a slicer threshold (e.g., 410*a*, 410*b*, 410*c*) and the second SDD threshold as a positive offset (e.g., 412*ab*, 412*bb*, 412*cb*) from the same slicer threshold along the axis 408.

In some embodiments, a slicer error may not be recorded when a symbol waveform is in a slicer deferred decision region. In some embodiments, a slicer error may be recorded when the symbol waveform is in a slicer hard decision region and a slicer hard decision has been applied to the symbol.

Figure 5:
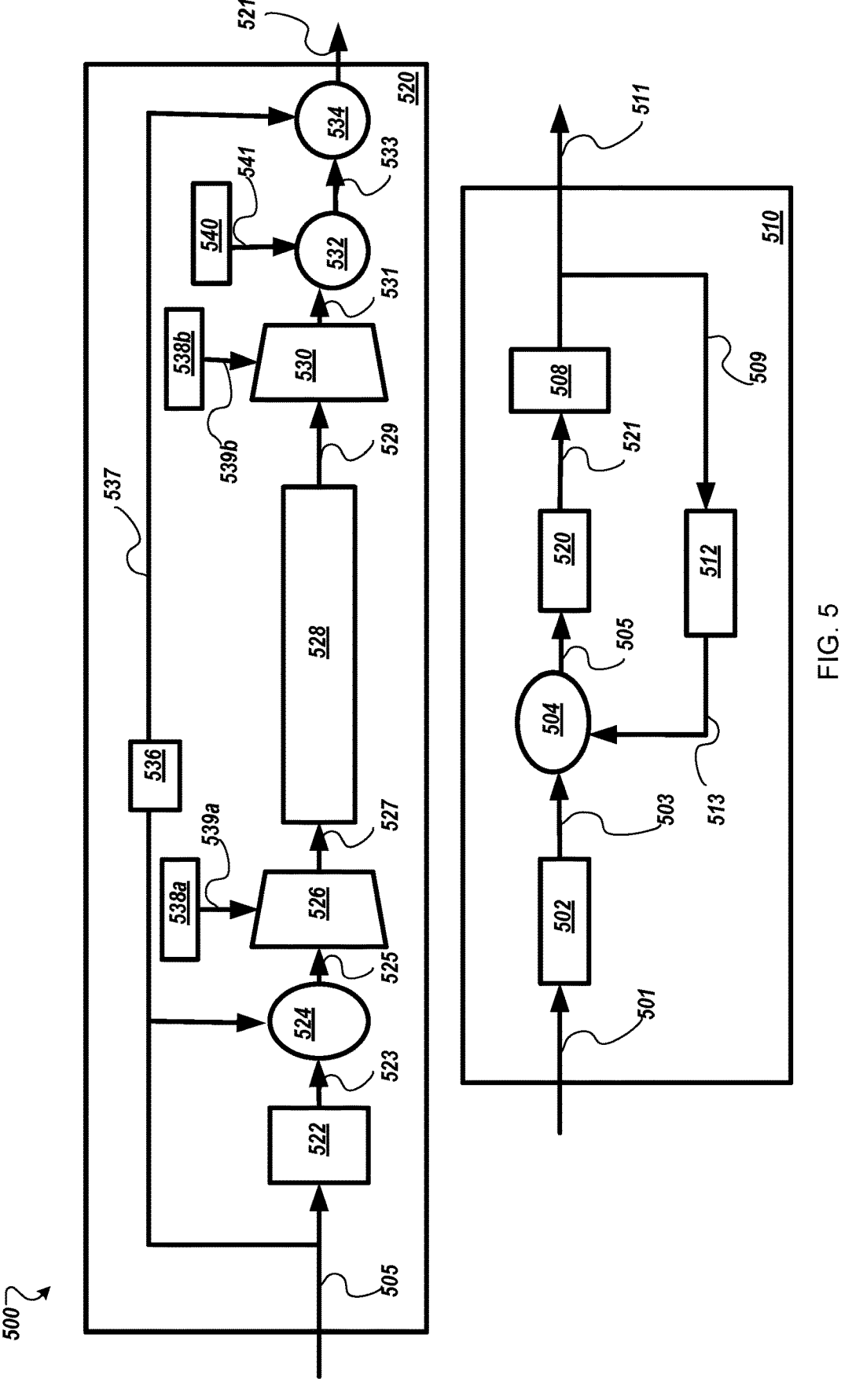
FIG. 5 illustrates an example equalizer including an example noise suppression block.

In some embodiments, FIG. 5 illustrates an example system 500 comprising a DFE 510 having a noise suppression block 520. The DFE 510 may comprise one or more of a feedforward filter 502, a subtractor 504, a feedback filter 512, a noise suppression block 520, and a hard slicer 508. The input signal 501 may include additive Gaussian noise (AGN) (e.g., AWGN) and may be directed to the feedforward filter 502. The feedforward filter 502 may output a signal 503 including a desired symbol, ISI, and AGN (e.g., AWGN). The signal 503 may be directed to a subtractor 504 which may be configured to subtract an output prediction, received from the feedback filter 512, from the signal 503 to generate a signal 505 having the desired symbol and a prediction error. The signal 505 may be output to the noise suppression block 520 which may be configured to generate a signal 521 having the desired symbol with suppressed error to be directed to the hard slicer 508. The hard slicer 508 may apply a hard decision to the signal 521 to provide an input signal 509 to the feedback filter 512 and an output decision signal 511. The feedback filter 512 may be configured to provide a feedback signal 513 to the subtractor 504.

In some embodiments, the DFE 510 may comprise a data-path equalization and may be used in FFE mode. In some examples, when a least mean square (LMS) circuitry is not configured to estimate FFE coefficients, the FFE coefficients may be estimated in firmware by tracking the channel updates. In some examples, a parallel FFE implementation may be employed, where multiple slices of Rx signal samples are processed by FFE on every data-path clock cycle. In such examples, noise-suppression may be applied to greater than one or more of: 90% of FFE slices, 95% of FFE slices, or 99% of FFE slices.

In some embodiments, the noise suppression block 520 may comprise one or more of a soft slicer 522, a subtractor 524, a mux 526, an arithmetic logic block 528 comprising data memory, a mux 530, a multiplier 532, a subtractor 534, or a delay block 536. The noise suppression block 520 may be configured to receive the signal 505 from the subtractor 504. The signal 505 may be directed to the soft slicer 522 which may be configured to direct a signal 523 to the subtractor to provide an error signal 525 comprising the slicer error to the mux 526. The mux 526 may be configured to receive a slicer deferred decision control signal 539a from the block 538a.

In some embodiments, the mux 526 may be configured to output a signal 527 that is selected as: (i) a '0' signal 525 when a slicer deferred decision is identified, and (ii) the error signal 525 (e.g., $e_n$) when a slicer hard decision is identified. The arithmetic logic block 528 comprising data memory may be configured to compute an estimator or predictor of a symbol slicer error (e.g., a slicer error estimator) using the correlated error from neighboring symbols. The arithmetic logic block 528 may be configured to direct the signal 529 to the mux 530. The mux 530 may be configured to receive a slicer deferred decision control signal 539b from the block 538b.

In some embodiments, the mux 530 may be configured to output a signal 531 that may be selected as: (i) a '0' signal when a slicer hard decision is identified, or (ii) as the signal 529 (e.g., $c_n$) when a slicer deferred decision is identified. The signal 531 may be directed to the multiplier 532 which may be configured to compute a signal 533 based on the signal 529 and a noise suppression factor 540 (e.g., $\alpha/(1+\beta)$) (which may be estimated in firmware based on data-path equalizer updates) sent via 541. In some cases, the signal 533 may be computed using a look-up-table in addition or in the alternative to the multiplier 532. The resulting signal 533 may be directed to the subtractor 534 which may be configured to remove the signal 533 from the time delayed signal 537 (as computed in the time delay block 536 based on the input signal 505). The output signal 521 from the noise suppression block 520 may be output to the hard slicer 508 to provide an output decision signal 511.

In some embodiments, as illustrated in FIG. 6, a noise suppression slicer 600 may be configured to receive a signal 601 from an FFE. The signal 601 may be directed to the soft slicer 602 and the sign extender 606. The soft slicer may be configured to receive a signal 605 from the multiplexer 604. The multiplexer 604 may be configured to receive slicer thresholds and slicer outputs from the slicer data output signal 617. The soft slicer 602 may be configured to receive a software determined configuration settings from 602a, which may include: (i) a noise suppression slicer enable instruction, (ii) an outer slicer error maximum limit, (iii) an outer slicer error minimum limit, and (iv) and SDD threshold offsets. In some embodiments, SDD threshold offsets may be used to determine when slicer deferred decisions are being made. An error estimator or predictor (e.g., block 644) may be used to suppress the correlated noise from one or more precursor symbols and one or more post-cursor symbols to allow for a hard decision on a subsequent cycle.

In some embodiments, the soft slicer 602 may be directly coupled to a switch 622 via 621 and may receive input from an OR gate 620. The OR gate 620 may be configured to close the switch when the OR gate 620 receives one or more slicer deferred decision enable signals for one or more of the $2^{nd}$ pre-cursor, the $1^{st}$ pre-cursor, the $1^{st}$ post-cursor, the $2^{nd}$ post-cursor, or the like of the signal at the soft slicer input 601. The one or more slicer deferred decision enable signals may be received from the output signal of the soft slicer 602 corresponding to the $2^{nd}$ pre-cursor, the $1^{st}$ pre-cursor, the $1^{st}$ post-cursor, the $2^{nd}$ post-cursor signals. The soft slicer may be configured to output a signal 603 which may be used to drive the slicer deferred decision enable signal for the current symbol to signal 619 of a neighboring symbol via 603a.

In some embodiments, directing the output signal 603 via 603a to the signal 619 may provide a reduction in power compared to a baseline noise suppression slicer. The signal 603 may drive the SDD enable signals 619 to the OR gate 620 so that power usage may be avoided when none of the neighboring symbols (e.g., n−1, n−2, n+1, n+2) lies in an SDD region (i.e., when they are all adequately reliable since they lie in a slicer hard decision region). When the neighboring symbols are adequately reliable, then they do not benefit from suppressing the correlated noise from the current symbol. By avoiding these computations, the NSS may have a power usage that may be reduced by greater than one or more of 90%, 95%, or 99% compared to a baselines NSS in which the slicer deferred decision enable signals from neighboring are not used to control the propagation of the slicer error signal 621 at the output of the soft slicer 602.

In some embodiments, when the switch 622 is closed (when the OR gate 620 has a truth value of '1'), the slicer error of the current symbol may be directed to the block 624 via the connection 623 to be directed to the sum block 626 (for the $1^{st}$ pre-cursor and the $1^{st}$ post-cursor) and to the sum block 628 (for the $2^{nd}$ pre-cursor and the $2^{nd}$ post-cursor) of a neighboring symbol via the connection 625.

In some embodiments, the $1^{st}$ pre-cursor and $1^{st}$ post-cursor slicer error may be directed from sum block 626 to be amplified by block 642 using NSS coefficients 642a that have been computed using software determined configuration settings. Similarly, the $2^{nd}$ pre-cursor and $2^{nd}$ post-cursor slicer error may be directed from sum block 628 to be amplified by block 640 using NSS coefficients 640a that have been computed using software determined configuration settings. The amplified signal from each of 642 and 640 may be directed to the multiplexer 634 and the multiplexer 636, respectively. The multiplexer 634 may be controlled by an NSS coefficient enable signal 634a and the multiplexer 636 may be controlled by an NSS coefficient enable signal 636a that may each be software determined configuration settings. The output from the multiplexer 634 and the multiplexer 636 may be directed to the sum block 638. The totality of the block 644 may be controlled by an enable signal 644a. The output from the sum block 638 may be directed to the sum block 610 as signal 639.

In some embodiments, the sum block 610 may be selected by the multiplexer 608 (using the control signal 603 received from the soft slicer 602) which may receive a signal 607a from the sign extender 606 which may receive signal 601.

In some embodiments, the signal 601 may be directed to sign extender 606 and then to de-multiplexer 608 as signal 607a. The de-multiplexer may be configured by the soft slicer output signal 603 (i.e., slicer deferred decision enable signal) to route signal 607a to the sum block 610 via 609a or may be configured to directly route signal 607a to multiplexer 614 via 609b. When the de-multiplexer 608 directs a signal 609a to the sum block 610, the resulting signal 611 may comprise suppressed noise based on the signal 639. The signal 611 may be directed to the residue number system (RNS) block 612, which may use a round-and-saturation block, and the RNS block 612 may direct a signal 613 to the multiplexer 614. The multiplexer 614 may be controlled by the output signal 603 of the soft slicer 602 to select an output comprising signal 613 or signal 609b. The signal 615 from multiplexer 614 may be directed to the hard slicer 618 or to the multiplexer 616.

In some embodiments, the hard slicer 618 may provide a decision output signal 651. The hard slicer 618 may be controlled by the block 618a which may comprise a modulation selection type (e.g., PAM4).

In some embodiments, the multiplexer 616 may receive the signal 615 from multiplexer 614 and the signal 607*b* from the sign extender 606. The multiplexer 614 may be controlled by a noise suppression slicer data mux selector to provide an output to one or more of a histogram computation logic, memory capture logic, slicer threshold estimation logic or SNR estimation logic.

In some embodiments, the software determined configuration settings in block 602*a* may correspond to the box 260 in the flow chart 200. In some embodiments, the software determined configuration settings in blocks 640*a* and 642*a* may correspond to the box 270 in the flow chart 200.

Figure 7:
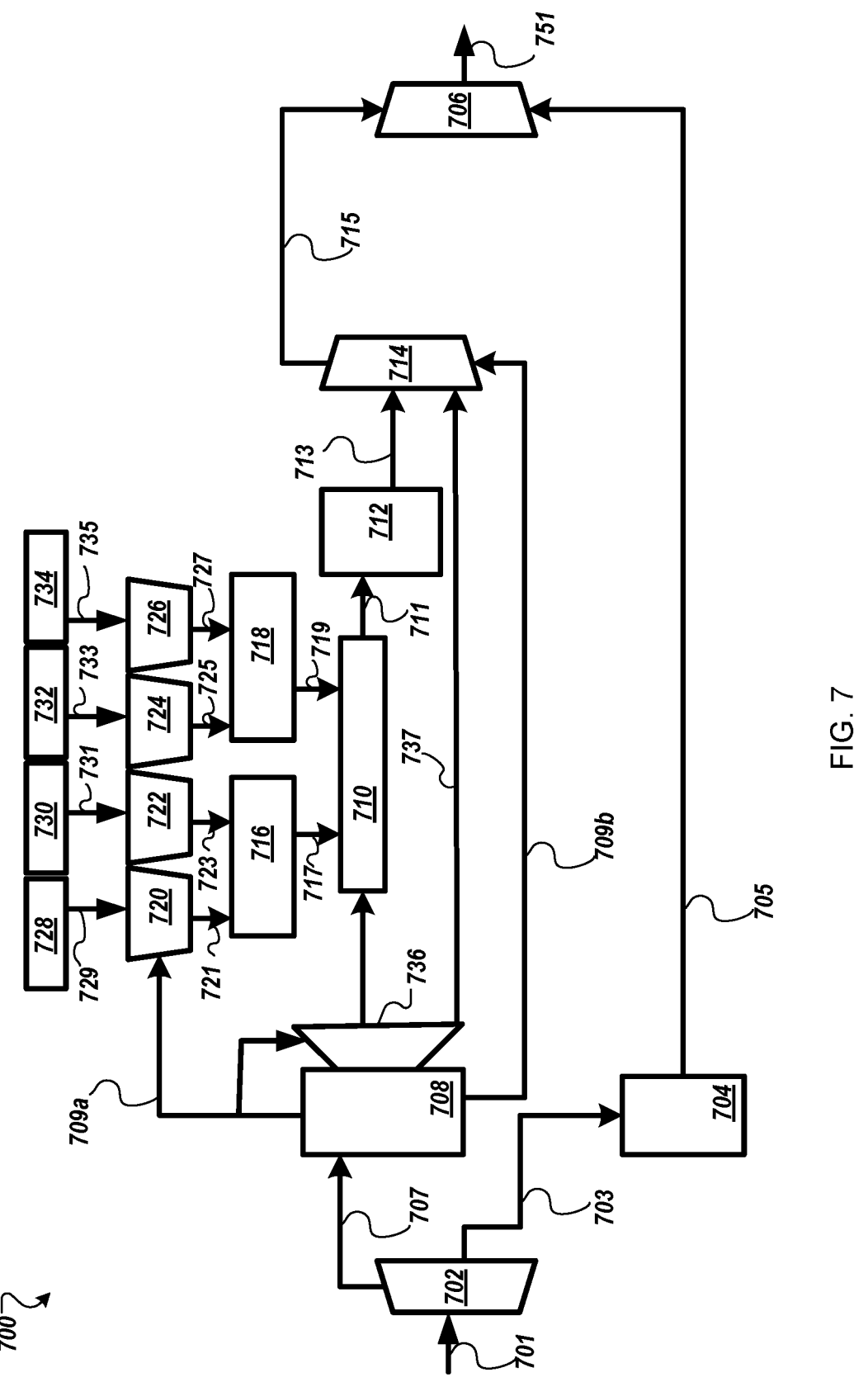
FIG. 7 illustrates a block diagram of an example noise suppression slicer.

In some embodiments, in the noise suppression slicer 700 as illustrated in FIG. 7, a de-multiplexor 702 may be configured to receive a signal 701. The signal 701 may comprise one or more slices of a selected number of bits. The output signal 703 from the de-multiplexor 702 may be directed to a hard slicer 704 which may be configured to send a decision output signal 705 to the multiplexor 706 to be output as signal 751.

In some embodiments, e.g., when a symbol is not present in a slicer hard decision region, then the output signal 707 from the de-multiplexor 702 may be directed to the soft slicer 708 which may receive one or more control signals comprising SDD thresholds (e.g., SDD threshold offsets). The soft slicer 708 may be configured to output a signal 709*a* to one or more of: (i) a de-multiplexor 736; or (ii) an enable gate for one or more of multiplexors 720, 722, 724, or 726. The enable gate for the one or more multiplexor 720, 722, 724, or 726 may be configured to enable noise suppression using one or more precursor symbols or one or more post-cursor symbols based on the reliability of the one or more precursor symbols or one or more post-cursor symbols.

In some embodiments, when the multiplexors 720, 722, 724, 726 are enabled, each of the multiplexors 720, 722, 724, 726 may receive a slicer error (e.g., for the precursor 728 received via 729, the $1^{st}$ post-cursor 730 received via 731, the $2^{nd}$ precursor 732 received via 733, the $2^{nd}$ post-cursor 734 received via 735, or the like). The output from the multiplexors 720, 722 (e.g., the first precursor and first post-cursor) may be directed to a sum and scale block 716 via connections 721 and 723. The output from multiplexors 724, 726 (e.g., the second precursor and second post-cursor) may be directed to a sum and scale block 718 via connections 725 and 727. The output associated with the first precursor and post-cursor may be directed via connection 717 to a sum block 710, and the output associated with the second precursor and post-cursor may be directed via connection 719 to the sum block 710.

In some embodiments, the sum block 710 may be configured to receive an output from the de-multiplexor 736. The sum block may output a signal 711 to the hard slicer 712, which may provide a decision output signal 713 to be directed via the multiplexor 714 to the multiplexer 706 via the connection 715. Therefore, when noise suppression is enabled, the path between the de-multiplexor 702, the hard slicer 704, and the multiplexer 706, may be substituted by the path between the de-multiplexor 702, the soft slicer 708, the de-multiplexer 736, the sum block 710, the hard slicer 712, the multiplexor 714, and the multiplexer 706 to provide a decision output signal 751.

In some embodiments, a noise suppression slicer may be configured to estimate the one or more NSS coefficients based on a channel noise of the output signal. In one example, y(n), the slicer input, may be computed using:

$$y(n) = \sum_{k=kmin}^{kmax} x(n-k)h(k)$$

where x(n) is the received signal at the analog to digital converter output and h(n) is the composite equalizer impulse response. Consequently, x(n) may be computed using:

$$x(n) = x_0(n) + e(n)$$

where e(n) is the noise term that may be independently and identically distributed (IID) Gaussian, such as AWGN. Furthermore y(n), the slicer input, may be computed using:

$$y(n) = y_0(n) + \varepsilon(n)$$

where $\varepsilon(n)$ is an error term that is not independently and identically distributed (i.e., non-IID). Furthermore, the error term for y(n) may be computed as:

$$\varepsilon(n) = \sum_{k=kmin}^{kmax} e(n-k)h(k)$$

where $\varepsilon(n)$ may be highly correlated with the first precursor error (i.e., $\varepsilon(n-1)$) and the first post-cursor error (i.e., $\varepsilon(n+1)$) when the pre-cursor FFE tap and the post-cursor FFE tap have large values.

In some embodiments, when the slicer input, y(n) is close to the slicer threshold (i.e., within the slicer deferred decision region as defined by an first x-axis value corresponding to a first NSS threshold offset and a second x-axis value corresponding to a second NSS threshold offset value), the error for y(n) (i.e., $\varepsilon(n)$) may be corrected by subtracting an estimate of $\varepsilon(n)$ from y(n). Because $\varepsilon(n)$ is correlated with $\varepsilon(n-1)$ and $\varepsilon(n+1)$, the error for $\varepsilon(n)$ may be linearly estimated using $\varepsilon(n-1)$ and $\varepsilon(n+1)$.

In some embodiments, the linear estimator for y(n) may be computed based on $\varepsilon(n-1)$ and $\varepsilon(n+1)$ using:

$$\varepsilon(n) = [\varepsilon(n-1)\varepsilon(n+1)] \cdot Rxx^{-1} \cdot Ryx$$

Consequently, the cross correlation of $\varepsilon(n)$ and $[\varepsilon(n-1); \varepsilon(n+1)]$ may be Ryx and the autocorrelation of $[\varepsilon(n-1); \varepsilon(n+1)]$ may be Rxx. Therefore, the cross-correlation, Ryx, may be computed using:

$$Ryx = \sum_{k=kmin}^{kmax} h(k-1)\left(h(k) \cdot \mathrm{Var}(e(n)) \cdot \left[\frac{1}{1-\beta^{\wedge}2}\frac{\beta}{1-\beta^2}; \frac{-\beta}{1-\beta^2}\frac{1}{1-\beta^2}\right]\right)$$

and the autocorrelation Rxx may be computed using:

$$Rxx = \sum_{k=kmin}^{kmax} h(k)\left(h(k) \cdot \mathrm{Var}(e(n)) \cdot \left[\frac{1}{1-\beta^{\wedge}2}\frac{-\beta}{1-\beta^2}; \frac{-\beta}{1-\beta^2}\frac{1}{1-\beta^2}\right]\right).$$

Based on these equations for the cross correlation and the autocorrelation, the NSS coefficients may be computed using:

$$\alpha = \left(\sum_{k=kmin}^{kmax} h(k-1)h(k) / \left(\sum_{k=kmin}^{kmax} h(k)h(k)\right)\right) \text{ and}$$

$$\beta = \left(\sum_{k=kmin}^{kmax} h(k-2)h(k) / \left(\sum_{k=kmin}^{kmax} h(k)h(k)\right)\right).$$

Therefore, the predictor for the error, ε(n), for the slicer input, y(n) may be computed using:

$$\varepsilon(n)=[\varepsilon(n-1)\varepsilon(n+1)]\cdot(\alpha/1+\beta))\cdot[1;1].$$

In some embodiments, the slicer error, may be used to compute NSS coefficients that may be used in noise suppression. In some examples, noise suppression may be used to reduce high frequency noise. In some examples, noise suppression may be used to reduce low frequency noise by using autocorrelation which may provide coefficients that may be opposite in sign coefficients that are not computed using autocorrelation (e.g., cross correlation). In some examples, the number of coefficients may be selected to affect different waveform profiles that may have differing shapes as illustrated using power spectral density.

Figure 8:
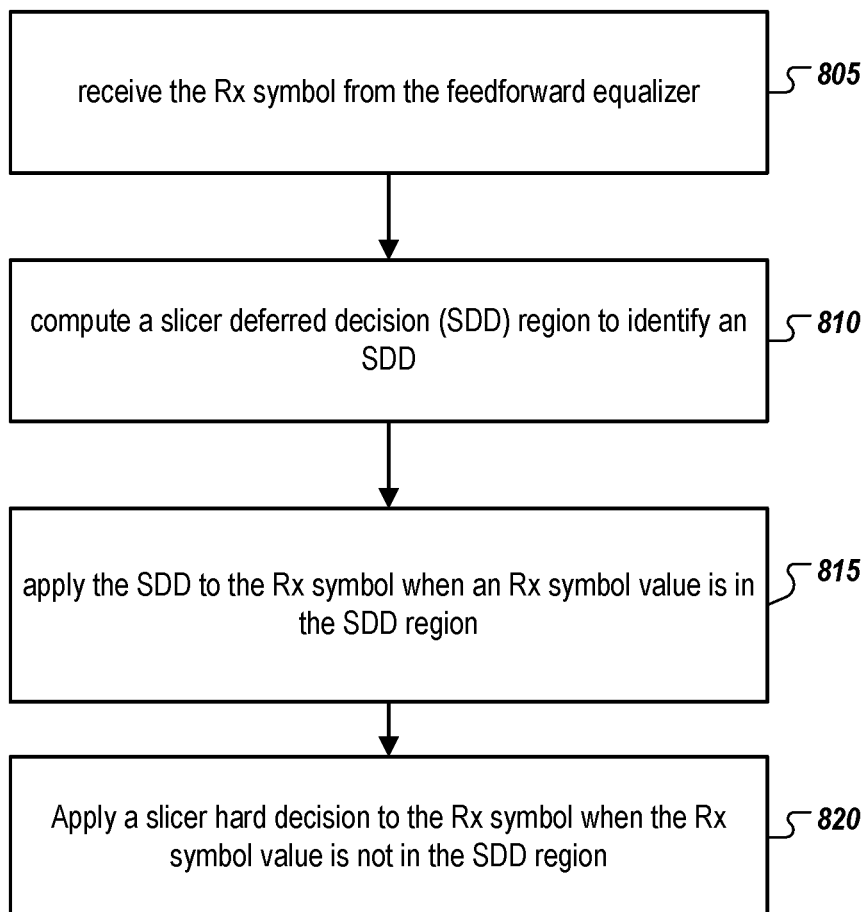
FIG. 8 illustrates a process flow of a DFE device.

FIG. 8 illustrates a process flow of an example method 800 that may be used for noise suppression in accordance with at least one embodiment described in the present disclosure. The method 800 may be arranged in accordance with at least one embodiment described in the present disclosure.

The method 800 may be performed by processing logic that may include hardware (circuitry, dedicated logic, etc.), software (such as is run on a computer system or a dedicated machine), or a combination of both, which processing logic may be included in the processing device 1202 of FIG. 12, the communication system 1100 of FIG. 11, or another device, combination of devices, or systems.

The method 800 may begin at block 805 where the processing logic may receive the Rx symbol from the feedforward equalizer.

At block 810, the processing logic may compute a slicer deferred decision (SDD) region to identify an SDD.

At block 815, the processing logic may apply the SDD to the Rx symbol when an Rx symbol value is in the SDD region.

At block 820, the processing logic may apply a slicer hard decision to the Rx symbol when the Rx symbol value is not in the SDD region.

Modifications, additions, or omissions may be made to the method 800 without departing from the scope of the present disclosure. For example, in some embodiments, the method 800 may include any number of other components that may not be explicitly illustrated or described.

Figure 9:
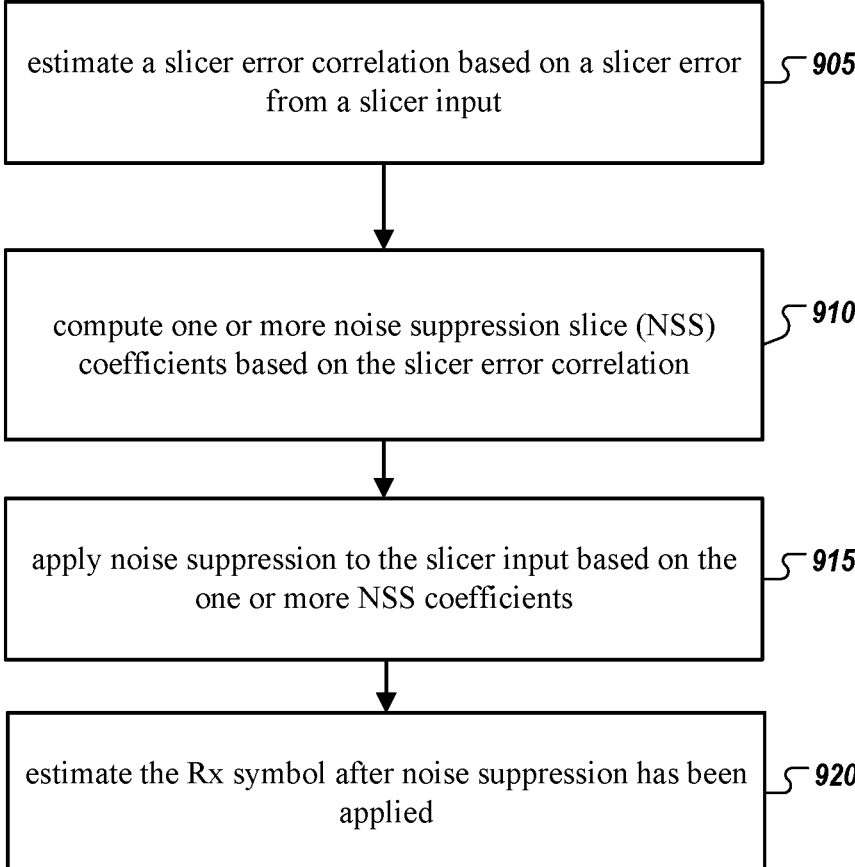
FIG. 9 illustrates a process flow of a DFE device.

FIG. 9 illustrates a process flow of an example method 900 that may be used for noise suppression, in accordance with at least one embodiment described in the present disclosure. The method 900 may be arranged in accordance with at least one embodiment described in the present disclosure.

The method 900 may be performed by processing logic that may include hardware (circuitry, dedicated logic, etc.), software (such as is run on a computer system or a dedicated machine), or a combination of both, which processing logic may be included in the processing device 1202 of FIG. 12, the communication system 1100 of FIG. 11, or another device, combination of devices, or systems.

The method 900 may begin at block 905 where the processing logic may estimate a slicer error correlation based on a slicer error from a slicer input.

At block 910, the processing logic may compute one or more noise suppression slice (NSS) coefficients based on the slicer error correlation.

At block 915, the processing logic may apply noise suppression to the slicer input based on the one or more NSS coefficients.

At block 920, the processing logic may estimate the Rx symbol after noise suppression has been applied.

Modifications, additions, or omissions may be made to the method 900 without departing from the scope of the present disclosure. For example, in some embodiments, the method 900 may include any number of other components that may not be explicitly illustrated or described.

FIG. 10 illustrates a process flow of an example method 1000 that may be used for noise suppression, in accordance with at least one embodiment described in the present disclosure. The method 1000 may be arranged in accordance with at least one embodiment described in the present disclosure.

The method 1000 may be performed by processing logic that may include hardware (circuitry, dedicated logic, etc.), software (such as is run on a computer system or a dedicated machine), or a combination of both, which processing logic may be included in the processing device 1202 of FIG. 12, the communication system 1100 of FIG. 11, or another device, combination of devices, or systems.

The method 1000 may begin at block 1005 where the processing logic may receive, from a feedforward equalizer, an output signal having a received (Rx) symbol.

At block 1010, the processing logic may initialize noise suppression slicer (NSS) parameters including one or more initial NSS coefficients and one or more initial slicer deferred decision (SDD) threshold offsets.

At block 1015, the processing logic may determine one or more updated NSS coefficients.

At block 1020, the processing logic may determine one or more updated slicer deferred decision (SDD) threshold offsets.

At block 1025, the processing logic may update the NSS parameters of a processing register based on the one or more updated NSS coefficients and the one or more updated SDD threshold offsets.

Modifications, additions, or omissions may be made to the method 1000 without departing from the scope of the present disclosure. For example, in some embodiments, the method 1000 may include any number of other components that may not be explicitly illustrated or described.

FIG. 11 illustrates a block diagram of an example communication system 1100 configured for noise suppression, in accordance with at least one embodiment described in the present disclosure. The communication system 1100 may include a digital transmitter 1102, a radio frequency circuit 1104, a device 1114, a digital receiver 1106, and a processing device 1108. The digital transmitter 1102 and the processing device may be configured to receive a baseband signal via connection 1110. A transceiver 1116 may comprise the digital transmitter 1102 and the radio frequency circuit 1104.

In some embodiments, the communication system 1100 may include a system of devices that may be configured to communicate with one another via a wired or wireline connection. For example, a wired connection in the communication system 1100 may include one or more Ethernet cables, one or more fiber-optic cables, and/or other similar wired communication mediums. Alternatively, or additionally, the communication system 1100 may include a system of devices that may be configured to communicate via one or more wireless connections. For example, the communication system 1100 may include one or more devices configured to transmit and/or receive radio waves, microwaves, ultrasonic waves, optical waves, electromagnetic induction, and/or similar wireless communications. Alternatively, or additionally, the communication system 1100 may include combinations of wireless and/or wired connections. In these and other embodiments, the communication system 1100 may include one or more devices that may be configured to obtain a baseband signal, perform one or more operations to the baseband signal to generate a modified baseband signal, and transmit the modified baseband signal, such as to one or more loads.

In some embodiments, the communication system 1100 may include one or more communication channels that may communicatively couple systems and/or devices included in the communication system 1100. For example, the transceiver 1116 may be communicatively coupled to the device 1114.

In some embodiments, the transceiver 1116 may be configured to obtain a baseband signal. For example, as described herein, the transceiver 1116 may be configured to generate a baseband signal and/or receive a baseband signal from another device. In some embodiments, the transceiver 1116 may be configured to transmit the baseband signal. For example, upon obtaining the baseband signal, the transceiver 1116 may be configured to transmit the baseband signal to a separate device, such as the device 1114. Alternatively, or additionally, the transceiver 1116 may be configured to modify, condition, and/or transform the baseband signal in advance of transmitting the baseband signal. For example, the transceiver 1116 may include a quadrature up-converter and/or a digital to analog converter (DAC) that may be configured to modify the baseband signal. Alternatively, or additionally, the transceiver 1116 may include a direct radio frequency (RF) sampling converter that may be configured to modify the baseband signal.

In some embodiments, the digital transmitter 1102 may be configured to obtain a baseband signal via connection 1110. In some embodiments, the digital transmitter 1102 may be configured to up-convert the baseband signal. For example, the digital transmitter 1102 may include a quadrature up-converter to apply to the baseband signal. In some embodiments, the digital transmitter 1102 may include an integrated digital to analog converter (DAC). The DAC may convert the baseband signal to an analog signal, or a continuous time signal. In some embodiments, the DAC architecture may include a direct RF sampling DAC. In some embodiments, the DAC may be a separate element from the digital transmitter 1102.

In some embodiments, the transceiver 1116 may include one or more subcomponents that may be used in preparing the baseband signal and/or transmitting the baseband signal. For example, the transceiver 1116 may include an RF front end (e.g., in a wireless environment) which may include a power amplifier (PA), a digital transmitter (e.g., 1102), a digital front end, an Institute of Electrical and Electronics Engineers (IEEE) 1588v2 device, a Long-Term Evolution (LTE) physical layer (L-PHY), an (S-plane) device, a management plane (M-plane) device, an Ethernet media access control (MAC)/personal communications service (PCS), a resource controller/scheduler, and the like. In some embodiments, a radio (e.g., a radio frequency circuit 1104) of the transceiver 1116 may be synchronized with the resource controller via the S-plane device, which may contribute to high-accuracy timing with respect to a reference clock.

In some embodiments, the transceiver 1116 may be configured to obtain the baseband signal for transmission. For example, the transceiver 1116 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 1116 may be configured to generate a baseband signal for transmission. In these and other embodiments, the transceiver 1116 may be configured to transmit the baseband signal to another device, such as the device 1114.

In some embodiments, the device 1114 may be configured to receive a transmission from the transceiver 1116. For example, the transceiver 1116 may be configured to transmit a baseband signal to the device 1114.

In some embodiments, the radio frequency circuit 1104 may be configured to transmit the digital signal received from the digital transmitter 1102. In some embodiments, the radio frequency circuit 1104 may be configured to transmit the digital signal to the device 1114 and/or the digital receiver 1106. In some embodiments, the digital receiver 1106 may be configured to receive a digital signal from the RF circuit and/or send a digital signal to the processing device 1108.

In some embodiments, the processing device 1108 may be a standalone device or system, as illustrated. Alternatively, or additionally, the processing device 1108 may be a component of another device and/or system. For example, in some embodiments, the processing device 1108 may be included in the transceiver 1116. In instances in which the processing device 1108 is a standalone device or system, the processing device 1108 may be configured to communicate with additional devices and/or systems remote from the processing device 1108, such as the transceiver 1116 and/or the device 1114. For example, the processing device 1108 may be configured to send and/or receive transmissions from the transceiver 1116 and/or the device 1114. In some embodiments, the processing device 1108 may be combined with other elements of the communication system 1100.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 12 illustrates a diagrammatic representation of a machine in the example form of a computing device 1200 within which a set of instructions, for causing the machine to perform any one or more of the methods discussed herein, may be executed. The computing device 1200 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 1200 includes a processing device (e.g., a processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)) and a data storage device 1216, which communicate with each other via a bus 1208.

Processing device 1202 represents one or more general-purpose processing devices such as a microprocessor, central processing unit, or the like. More particularly, the processing device 1202 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also include one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein.

The computing device 1200 may further include a network interface device 1222 which may communicate with a network 1218. The computing device 1200 also may include a display device 1210 (e.g., a liquid crystal display (LCD) or a cathode ray tube (CRT)), an alphanumeric input device 1212 (e.g., a keyboard), a cursor control device 1214 (e.g., a mouse) and a signal generation device 1220 (e.g., a speaker). In at least one embodiment, the display device 1210, the alphanumeric input device 1212, and the cursor control device 1214 may be combined into a single component or device (e.g., an LCD touch screen).

The data storage device 1216 may include a computer-readable storage medium 1224 on which is stored one or more sets of instructions 1226 embodying any one or more of the methods or functions described herein. The instructions 1226 may also reside, completely or at least partially, within the main memory 1204 and/or within the processing device 1202 during execution thereof by the computing device 1200, the main memory 1204 and the processing device 1202 also constituting computer-readable media. The instructions may further be transmitted or received over a network 1218 via the network interface device 1222.

While the computer-readable storage medium 1224 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

EXAMPLES

The following provide examples of the performance characteristics according to embodiments of the present disclosure.

Figure 13A:
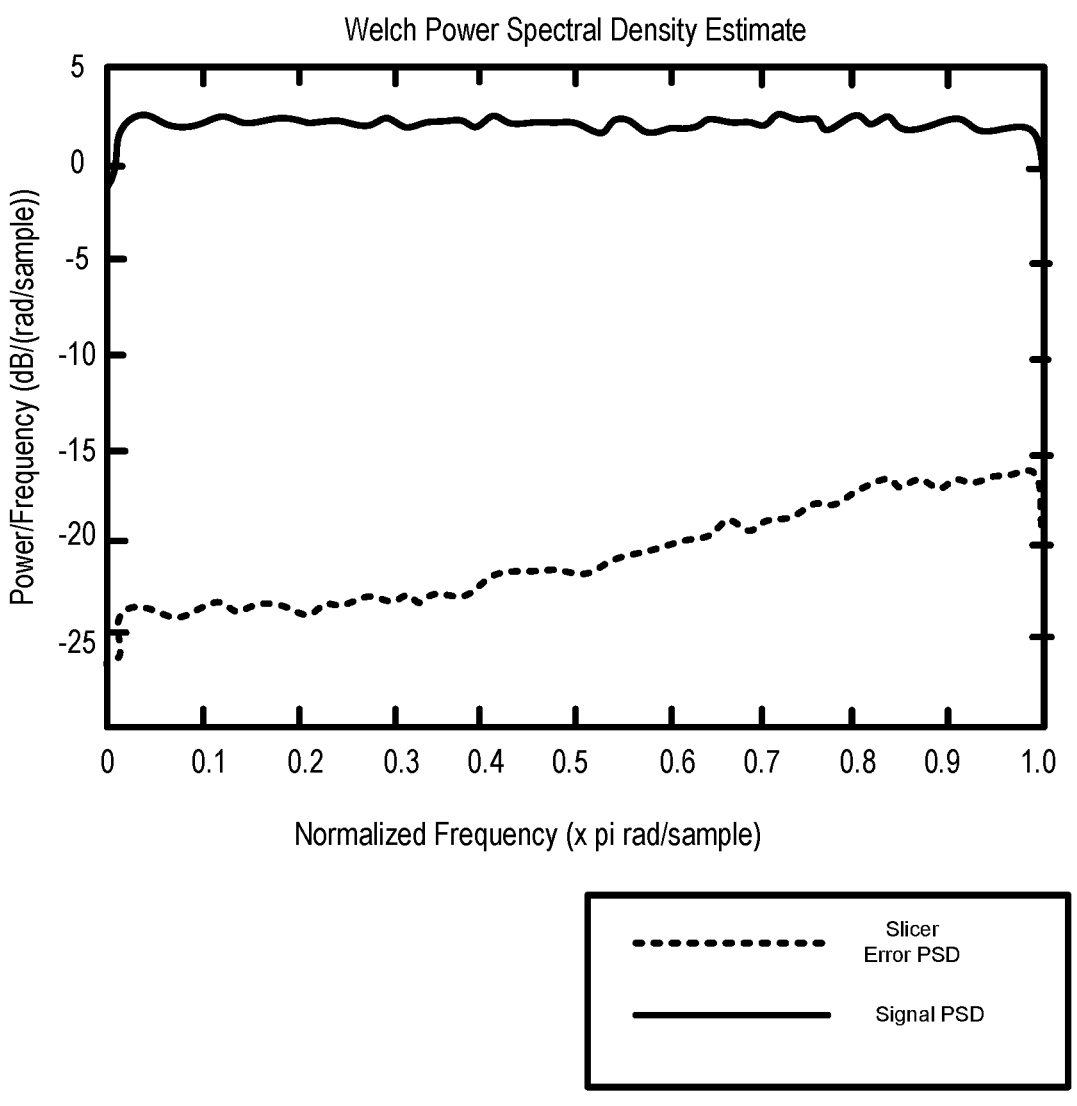
FIG. 13A illustrates example results using FFE and noise expression.

Example 1: Comparison Between FFE and FFE with Noise Suppression for a Higher Loss Channel FIGS. 13A and 13B illustrate example results using various techniques hardware and/or processing logic described herein. FIGS. 13A and 13B illustrate the Welch power spectral density and the bit error rate (BER) for a higher loss channel compared to the channel illustrated in FIGS. 14A and 14B.

As shown in FIG. 13A, the slicer error power spectral density ranged from about −25 (dB/rad/sample) for a normalized frequency of about 0.01 (in units of x pi rad/sample), to about −22 (dB/rad/sample) for a normalized frequency of about 0.5 (in units of x pi rad/sample), to about −17 (dB/rad/sample) for a normalized frequency of about 0.8 (in units of x pi rad/sample), to about −16 (dB/rad/sample) for a normalized frequency of about 0.99 (in units of x pi rad/sample). The signal power spectral density varied between about 2 (dB/rad/sample) and about 2.5/rad/sample over a normalized frequency of about 0.01 (in units of x pi rad/sample) to about 0.99 (in units of x pi rad/sample). The signal power peaked at about 7 dB over the normalized frequency range.

The signal having the slicer error power spectral density and signal power spectral density, as shown in FIG. 13A, were simulated in FIG. 13B for an FFE example and for an FFE with noise suppression example based on the slicer signal to noise ratio to compute the bit error rate.

For the FFE example, as shown using the double dot line, the bit error rate ranged approximately linearly from about $0.4 \times 10^{-5}$ for a slicer SNR of about 19.75, to about $0.8 \times 10^{-7}$ for a slicer SNR of about 21, to about $1 \times 10^{-9}$ for a slicer SNR of about 22.

For the FFE with noise suppression example, as shown using the solid line, the bit error rate ranged approximately linearly from about $1 \times 10^{-7}$ for a slicer SNR of about 19.75, to about $1 \times 10^{-9}$ for a slicer SNR of about 21.

The bit error rate performance for the FFE with noise suppression increased relative to the bit error rate performance for the FFE example. The FFE with noise suppression example achieved a bit error rate of about $4.9 \times 10^{-8}$ at a slicer SNR of about 19.95. In contrast, the FFE example achieved a similar bit error rate of about $4.3 \times 10^{-8}$ at a higher slicer SNR of about 21.2. Thus, the bit error rate performance for the FFE with noise suppression achieved a similar bit error rate compared to the FFE example at a slicer SNR that is about 1.25 dB lower.

Moreover, the FFE with noise suppression example achieved a bit error rate of about $9 \times 10^{-9}$ at a slicer SNR of about 20.45. In contrast, the FFE example achieved a similar bit error rate of about $8 \times 10^{-9}$ at a higher slicer SNR of about 21.7. Thus, the bit error rate performance for the FFE with noise suppression achieved a similar bit error rate compared to the FFE example at a slicer SNR that is about 1.25 dB lower.

The simulation results illustrate that the bit error rate was similar between the FFE with noise suppression example compared to the FFE example at reduced slicer SNRs. The FFE with noise suppression example was true across the tested slicer SNR range from about 19.75 dB to about 22 dB.

Figure 14A:
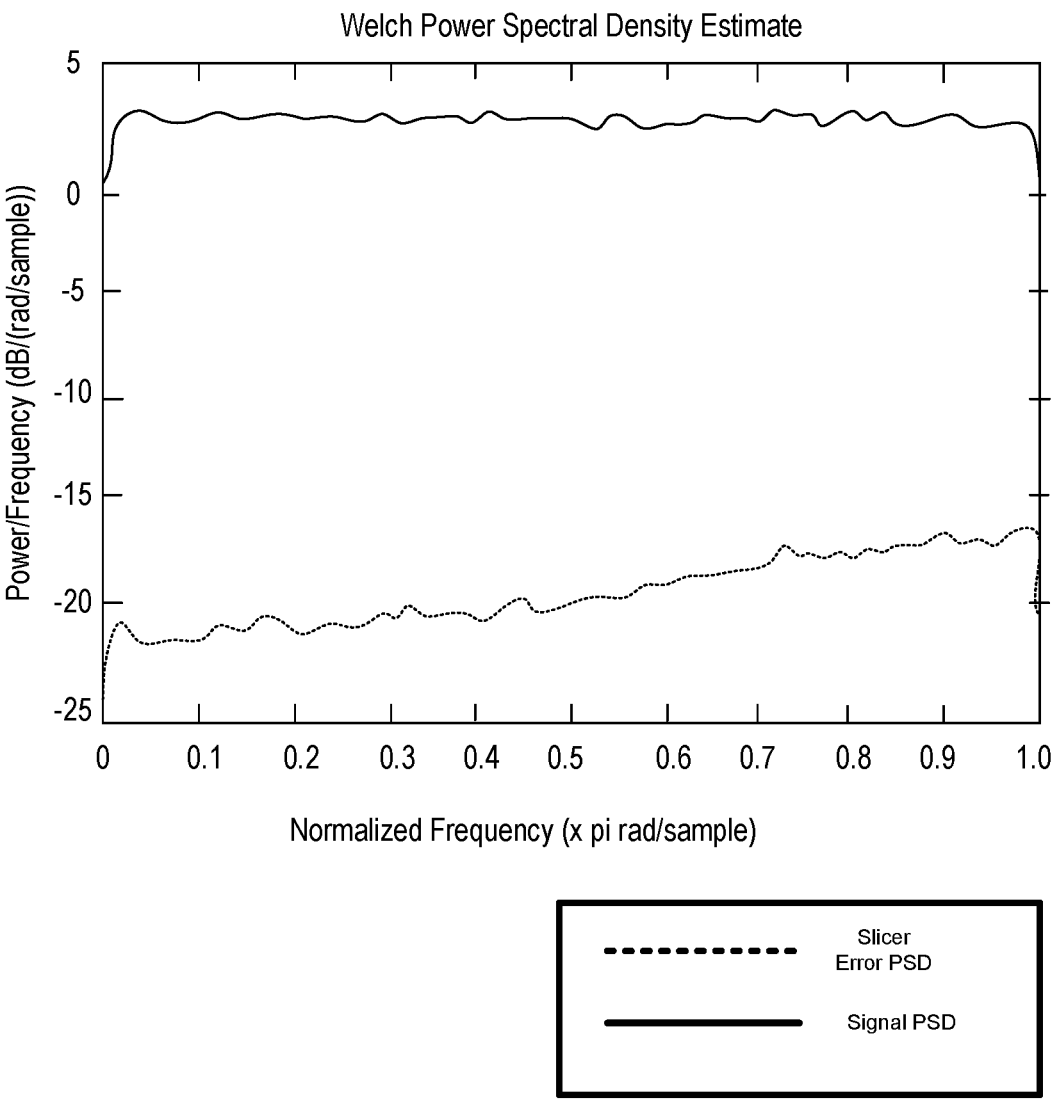
FIG. 14A illustrates example results using FFE and noise expression.
Figure 14B:
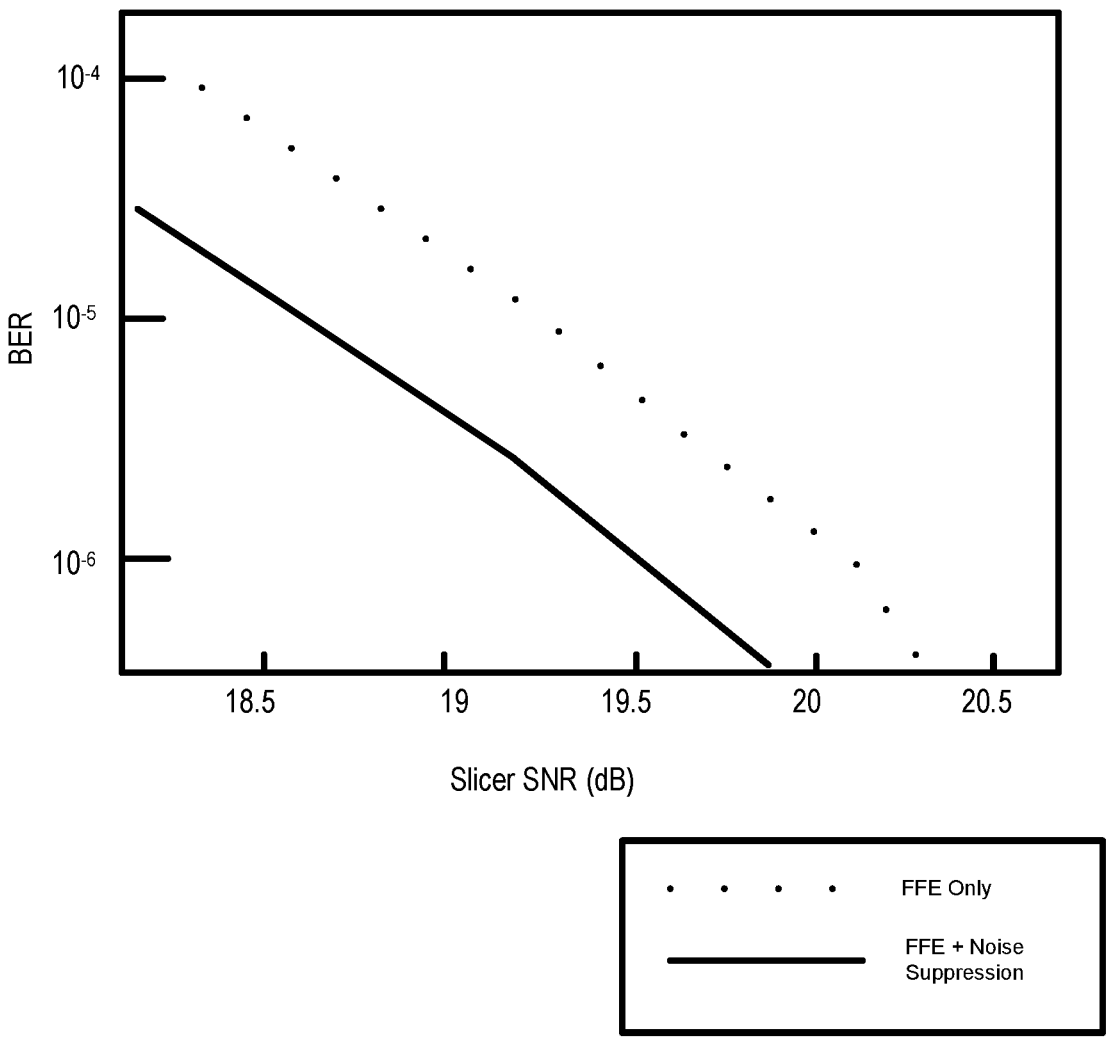
FIG. 14B illustrates example results using FFE and noise expression.
Figure 15:
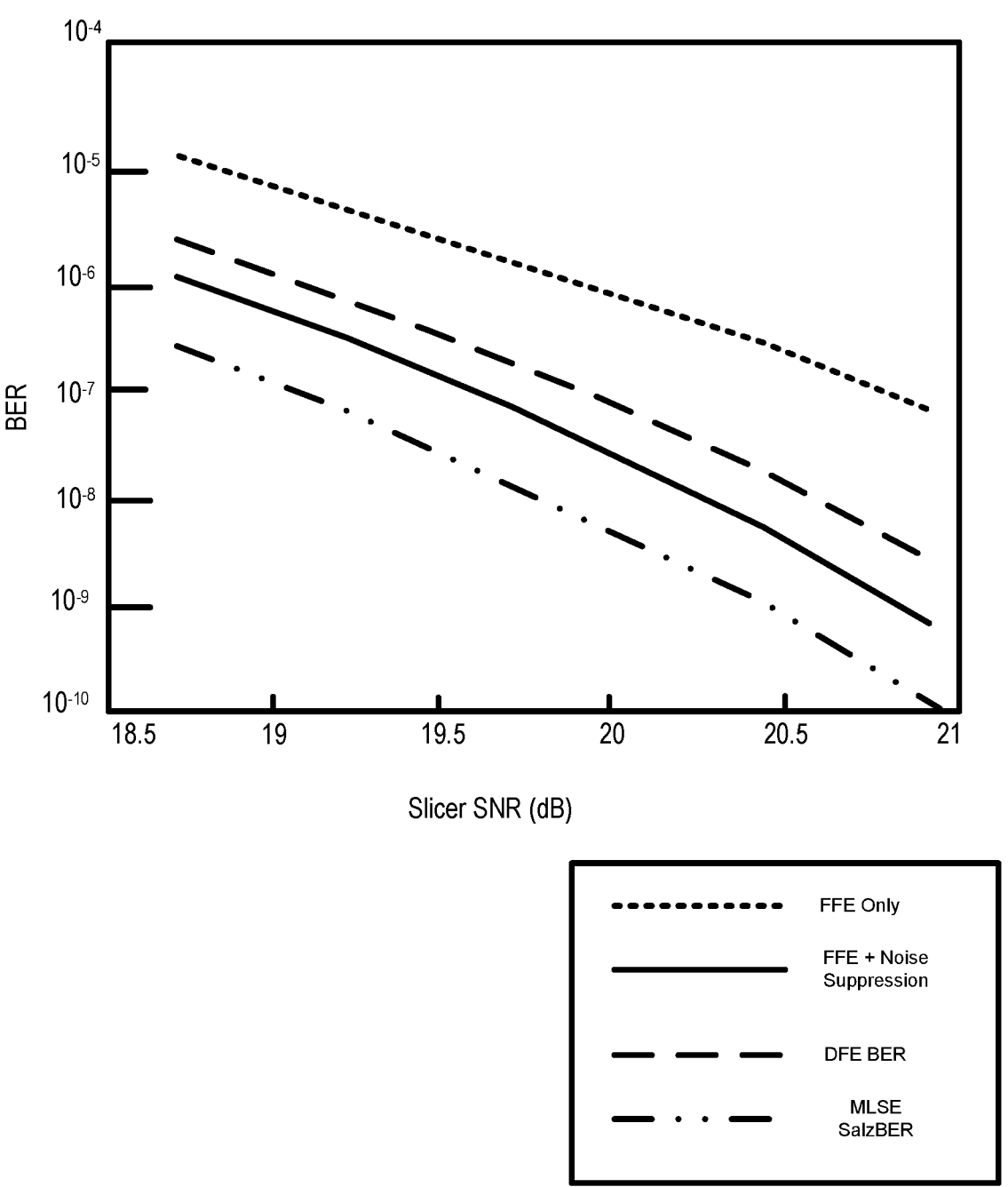
FIG. 15 illustrates example results using FFE and noise expression.

Example 2: Comparison Between FFE and FFE with Noise Suppression for a Lower Loss Channel FIGS. 14A to 14B illustrate example results using various techniques hardware and/or processing logic described herein. FIGS. 14A and 14B illustrate the Welch power spectral density and the bit error rate (BER) for a lower loss channel compared to the channel illustrated in FIGS. 13A and 13B.

As shown in FIG. 14A, the slicer error power spectral density ranged from about −20 (dB/rad/sample) for a normalized frequency of about 0.01 (in units of x pi rad/sample), to about −19 (dB/rad/sample) for a normalized frequency of about 0.5 (in units of x pi rad/sample), to about −16 (dB/rad/sample) for a normalized frequency of about 0.8 (in units of x pi rad/sample), to about −15 (dB/rad/sample) for a normalized frequency of about 0.99 (in units of x pi rad/sample). The signal power spectral density varied between about 2 (dB/rad/sample) and about 2.5/rad/sample over a normalized frequency of about 0.01 (in units of x pi rad/sample) to about 0.99 (in units of x pi rad/sample). The signal power peaked at about 4 dB over the normalized frequency range.

The signal having the slicer error power spectral density and signal power spectral density, as shown in FIG. 14A, were simulated in FIG. 14B for an FFE example and for an FFE with noise suppression example based on the slicer signal to noise ratio to compute the bit error rate.

For the FFE example, as shown using the double dot line, the bit error rate ranged approximately linearly from about $0.6 \times 10^{-4}$ for a slicer SNR of about 18.5, to about $0.1 \times 10^{-4}$ for a slicer SNR of about 19, to about $1 \times 10^{-6}$ for a slicer SNR of about 20.

For the FFE with noise suppression example, as shown using the solid line, the bit error rate ranged approximately linearly from about $0.1 \times 10^{-4}$ for a slicer SNR of about 18.5, to about $1 \times 10^{-6}$ for a slicer SNR of about 19.7.

The bit error rate performance for the FFE with noise suppression increased relative to the bit error rate performance for the FFE example. The FFE with noise suppression example achieved a bit error rate of about $1 \times 10^{-5}$ at a slicer SNR of about 18.61. In contrast, the FFE example achieved a similar bit error rate of about $1.1 \times 10^{-5}$ at a higher slicer SNR of about 19.12. Thus, the bit error rate performance for the FFE with noise suppression achieved a similar bit error rate compared to the FFE example at a slicer SNR that was about 0.51 dB lower.

Moreover, the FFE with noise suppression example achieved a bit error rate of about $1.7 \times 10^{-6}$ at a slicer SNR of about 19.37. In contrast, the FFE example achieved a similar bit error rate of about $1.6 \times 10^{-6}$ at a higher slicer SNR of about 19.87. Thus, the bit error rate performance for the FFE with noise suppression achieved a similar bit error rate compared to the FFE example at a slicer SNR that was about 0.50 dB lower.

The simulation results illustrate that the bit error rate was similar between the FFE with noise suppression example compared to the FFE example at reduced slicer SNRs. The FFE with noise suppression example was true across the tested slicer SNR range from about 18 dB to about 20.5 dB.

Example 3: Comparison Between FFE with Noise Suppression and the Theoretical Limit FIG. 14 illustrates example results and a comparison versus a theoretical limit using various techniques hardware and/or processing logic described herein. As illustrated in FIG. 14, simulations results showed that the FFE with noise suppression example provided a bit error rate based on slicer SNR that was near the theoretical limit. In contrast, the DFE BER example and the FFE only example provided a bit error rate based on slicer SNR that had worse performance than the FFE with noise suppression example.

For the FFE example, as shown using the dotted line, the bit error rate ranged approximately linearly from about $0.1 \times 10^{-4}$ for a slicer SNR of about 19 to about $1 \times 10^{-7}$ for a slicer SNR of about 21.

For the DFE BER example, as shown using the dashed line, the bit error rate ranged approximately linearly from about $0.1 \times 10^{-5}$ for a slicer SNR of about 19 to about $0.4 \times 10^{-8}$ for a slicer SNR of about 21.

For the FFE with noise suppression example, as shown using the solid line, the bit error rate ranged approximately linearly from about $1 \times 10^{-6}$ for a slicer SNR of about 19, to about $1 \times 10^{-9}$ for a slicer SNR of about 21.

For the theoretical limit (as computed using the Salz SNR method), as shown using the dashed and double-dotted line, the bit error rate ranged approximately linearly from about $0.1 \times 10^{-7}$ for a slicer SNR of about 19, to about $1 \times 10^{-10}$ for a slicer SNR of about 21.

The bit error rate performance for the FFE with noise suppression increased relative to the bit error rate performance for the DFE BER example and the FFE example. The FFE with noise suppression example achieved a bit error rate of about $5.4 \times 10^{-7}$ at a slicer SNR of about 19.21. In contrast, the DFE BER example achieved a similar bit error rate of about $6.5 \times 10^{-7}$ at a higher slicer SNR of about 19.46. Further in contrast, the FFE example achieved a similar bit error rate of about $4.9 \times 10^{-7}$ at a higher slicer SNR of about 20.46. Thus, the bit error rate performance for the FFE with noise suppression achieved a similar bit error rate compared to the DFE BER example and the FFE example at a slicer SNR that was about 1.25 dB lower with respect to the FFE example and about 0.25 dB lower with respect to the DFE BER example.

The bit error rate performance for the FFE with noise suppression increased relative to the bit error rate performance for the DFE BER example and the FFE example at other points along the lines displayed. The FFE with noise suppression example achieved a bit error rate of about $1.4 \times 10^{-7}$ at a slicer SNR of about 19.71. In contrast, the DFE BER example achieved a similar bit error rate of about $1.4 \times 10^{-7}$ at a higher slicer SNR of about 19.96. Further in contrast, the FFE example achieved a similar bit error rate of about $1.0 \times 10^{-7}$ at a higher slicer SNR of about 20.96. Thus, the bit error rate performance for the FFE with noise suppression achieved a similar bit error rate compared to the DFE BER example and the FFE example at a slicer SNR that was about 1.25 dB lower with respect to the FFE example and about 0.25 dB lower with respect to the DFE BER example.

The FFE with noise suppression example also achieved an increased BER performance at a fixed SNR. The FFE with noise suppression example achieved a bit error rate of about $7.2 \times 10^{-9}$ at a slicer SNR of about 20.46. In contrast, the DFE BER example achieved a bit error rate of about $2.51 \times 10^{-8}$ at the same SNR of about 20.46. Further in contrast, the FFE example achieved a bit error rate of about $4.87 \times 10^{-7}$ at the same SNR of about 20.46. Thus, the bit error rate performance for the FFE with noise suppression achieved increased bit error rate performance compared to the DFE BER example and the FFE example for the same slicer SNR. Moreover, the FFE with noise suppression example achieved a BER that was close to the theoretical limit $(7.2\times10^{-9}$ for the FFE with noise suppression example versus $1.38\times10^{-9}$ for the theoretical limit) at the same slicer SNR of 20.46.

The FFE with noise suppression example was within about 0.5 dB of the theoretical limit for the BER bound. The theoretical bound for a particular SNR was: (i) about $4.58\times 10^{-7}$ at an SNR of about 18.71; (ii) about $1.07\times10^{-7}$ at an SNR of about 19.21; (iii) about $1.38\times10^{-9}$ at an SNR of about 20.46.

Similar SNR points for the FFE with noise suppression example show that the FFE with noise suppression example is about 0.5 dB from the theoretical limit for a particular BER. For a theoretical BER of about $4.58\times10^{-7}$ at an SNR of about 18.71, the FFE with noise suppression example has a similar BER of about $5.4\times10^{-7}$ at an SNR of about 19.21. For a theoretical BER of about $1.07\times10^{-7}$ at an SNR of about 19.21, the FFE with noise suppression example has a similar BER of about $1.15\times10^{-7}$ at an SNR of about 19.71. For a theoretical BER of about $1.38\times10^{-9}$ at an SNR of about 20.46, the FFE with noise suppression example has a similar BER of about $1\times10^{-9}$ at an SNR of about 20.96.

Moreover, the DFE with noise suppression example outperformed the DFE example by about 0.3 dB in channels with about 30% precursor. Therefore, the performance enhancement for the DFE with noise suppression example relative to the DFE example occurred in different situations.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A decision feedback equalizer device, comprising:
   a feedforward equalizer configured to output a signal having a received (Rx) symbol; and
   a processing device configured to:
      receive the Rx symbol from the feedforward equalizer;
      compute a slicer deferred decision (SDD) region to identify an SDD;
      apply the SDD to the Rx symbol when an Rx symbol value is in the SDD region by adjusting a slicer input for the Rx symbol by subtracting a weighted combination of slicer errors of one or more neighboring hard-sliced symbols; and
      apply a slicer hard decision to the Rx symbol when the Rx symbol value is not in the SDD region.

2. The decision feedback equalizer device of claim 1, wherein the processing device is further configured to:
   identify the SDD region by computing a first SDD threshold offset of a first slicer threshold and a second SDD threshold offset of the first slicer threshold, wherein the SDD region is the region between the first SDD threshold offset and the second SDD threshold offset; and
   write the first SDD threshold offset and the second SDD threshold offset to a register of the processing device.

3. The decision feedback equalizer device of claim 1, wherein the processing device is further configured to:

compute a signal-to-noise ratio (SNR) of the signal; and compute a mapping between the SNR and the SDD region.

4. The decision feedback equalizer device of claim 1, wherein the processing device is further configured to:

compute an outer slicer error minimum limit;

compute an outer slicer error maximum limit; and write the outer slicer error minimum limit and the outer slicer error maximum limit to a register of the processing device.

5. The decision feedback equalizer device of claim 1, wherein the processing device is further configured to:

apply noise suppression to the slicer input; and compute an updated SDD region to apply an updated slicer hard decision after the noise suppression has been applied.

6. The decision feedback equalizer device of claim 5, wherein the processing device is further configured to:

apply the updated slicer hard decision to the Rx symbol when the Rx symbol value is not in the updated SDD region.

7. The decision feedback equalizer device of claim 1, wherein the processing device is further configured to compute a slicer error when the slicer hard decision is applied to the Rx symbol.

8. The decision feedback equalizer device of claim 1, wherein the processing device is further configured to discontinue Rx symbol processing after the slicer hard decision is applied to the Rx symbol.

9. The decision feedback equalizer device of claim 1, wherein the processing device is further configured to:

compute the SDD region in one or more of in real-time or on-demand.

10. A decision feedback equalizer (DFE) device, comprising:

a feedforward equalizer configured to output a signal having a received (Rx) symbol; and a processing device configured to:

compute, for one or more neighboring symbols that have been hard-sliced, a slicer error for each neighboring symbol as a difference between a slicer input and a corresponding slicer hard decision, and estimate a slicer-error correlation based on the slicer errors;

compute one or more noise suppression slicer (NSS) coefficients based on the slicer error correlation;

apply noise suppression to the slicer input by subtracting a weighted combination of the slicer errors using the NSS coefficients; and estimate the Rx symbol by applying a slicer hard decision to the noise-suppressed slicer input.

11. The device of claim 10, wherein the processing device is further configured to:

send the one or more NSS coefficients to one or more infinite impulse response (IIR) filters; and update the one or more NSS coefficients based on IIR outputs from the IIR filters.

12. The device of claim 10, wherein the processing device is further configured to:

compute a slicer error estimator based on correlated noise from neighboring symbols within a proximity that is selected to reduce the slicer error in the slicer input;

apply the noise suppression using the slicer error estimator.

13. The device of claim 10, wherein the processing device is further configured to:

compute a slicer error estimator based on a weighted combination of one or more of: slicer error from an (n−1) symbol and an (n+1) symbol; or slicer error from an (n−2) symbol and an (n+2) symbol; and apply the noise suppression using the slicer error estimator.

14. The decision feedback equalizer device of claim 10, wherein the slicer error correlation is one or more of cross correlation or auto-correlation.

15. The decision feedback equalizer device of claim 10, wherein the processing device is further configured to:

write the one or more NSS coefficients to a register of the processing device.

16. The decision feedback equalizer device of claim 10, wherein the processing device is further configured to:

estimate the one or more NSS coefficients based on a channel noise of an output signal; or compute the one or more NSS coefficients in one or more of: periodically, in real-time, or on-demand.

17. A non-transitory computer-readable storage medium including computer executable instructions that, when executed by one or more processors, cause a decision feedback equalizer (DFE) to:

receive, from a feedforward equalizer, an output signal that defines a slicer input a received (Rx) symbol;

initialize noise suppression slicer (NSS) parameters including one or more initial NSS coefficients and one or more initial slicer deferred decision (SDD) threshold offsets;

determine one or more updated NSS coefficients based on slicer-error correlation;

determine one or more updated SDD threshold offsets based at least in part on a signal-to-noise ratio (SNR) or a signal to noise and distortion (SNDR) at the slicer input; and update the NSS parameters of a processing register based on the one or more updated NSS coefficients and the one or more updated SDD threshold offsets.

18. The non-transitory computer-readable storage medium of claim 17, wherein the instructions, when executed by the one or more processors, cause the DFE to:

compute an outer slicer error minimum limit;

compute an outer slicer error maximum limit; and write the outer slicer error minimum limit and the outer slicer error maximum limit to the processing register.

19. The non-transitory computer-readable storage medium of claim 17, wherein the instructions, when executed by the one or more processors, cause the DFE to:

receive an Rx symbol from a feedforward equalizer;

apply a slicer hard decision when an Rx symbol value is not in an SDD region; and apply noise suppression based on the NSS coefficients to the Rx symbol when the Rx symbol value is in the SDD region.

20. The non-transitory computer-readable storage medium of claim 17, wherein the instructions, when executed by the one or more processors, cause the DFE to:

estimate the one or more NSS coefficients based on a channel noise of the output signal; or determine the one or more NSS coefficients based on slicer error correlation.

\* \* \* \* \*